(12) United States Patent
Kagami

(10) Patent No.: US 10,693,161 B2
(45) Date of Patent: Jun. 23, 2020

(54) FUEL CELL SYSTEM AND METHOD FOR CONTROLLING SAME

(71) Applicant: NISSAN MOTOR CO., LTD., Yokohama-shi, Kanagawa (JP)

(72) Inventor: Fumio Kagami, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/330,653

(22) PCT Filed: Sep. 7, 2016

(86) PCT No.: PCT/JP2016/076349
§ 371 (c)(1),
(2) Date: Mar. 5, 2019

(87) PCT Pub. No.: WO2018/047259
PCT Pub. Date: Mar. 15, 2018

(65) Prior Publication Data
US 2019/0348694 A1    Nov. 14, 2019

(51) Int. Cl.
*H01M 8/04828* (2016.01)
*H01M 8/04119* (2016.01)
*H01M 8/04082* (2016.01)
*H01M 8/0432* (2016.01)
*H01M 8/04746* (2016.01)

(52) U.S. Cl.
CPC ....... *H01M 8/0485* (2013.01); *H01M 8/0432* (2013.01); *H01M 8/04126* (2013.01); *H01M 8/04201* (2013.01); *H01M 8/04753* (2013.01)

(58) Field of Classification Search
CPC .......... H01M 8/04828; H01M 8/0485; H01M 8/0432; H01M 8/04119; H01M 8/04126; H01M 8/04746; H01M 8/04732; H01M 8/04082; H01M 8/04201
See application file for complete search history.

(56) References Cited

U.S. PATENT DOCUMENTS

| | | | |
|---|---|---|---|
| 2001/0005557 | A1 | 6/2001 | Yosida et al. |
| 2002/0187383 | A1 | 12/2002 | Katagiri et al. |
| 2005/0053809 | A1 | 3/2005 | Hayashi et al. |
| 2007/0248870 | A1 | 10/2007 | Mogi et al. |
| 2010/0227242 | A1 | 9/2010 | Morita |
| 2012/0308905 | A1 | 12/2012 | Kawahara et al. |
| 2014/0017589 | A1 | 1/2014 | Takami |
| 2014/0134508 | A1* | 5/2014 | Ishikawa ........... H01M 8/04179 429/430 |

FOREIGN PATENT DOCUMENTS

| | | |
|---|---|---|
| CN | 103460468 A | 12/2013 |
| CN | 103597642 A | 2/2014 |

(Continued)

*Primary Examiner* — Karie O'Neill Apicella
(74) *Attorney, Agent, or Firm* — Foley & Lardner LLP

(57) ABSTRACT

There is provided a fuel cell system having a fuel cell, which determines whether an operating state thereof is a low-temperature-startup operation or a normal-running operation and performs recovery control for increasing a concentration gradient of water in an electrolyte membrane of the fuel cell to be greater than that in the normal-running operation when it is determined that the operating state is the low-temperature-startup operation.

15 Claims, 23 Drawing Sheets

(56) References Cited

FOREIGN PATENT DOCUMENTS

| JP | 2002-367641 | A | 12/2002 |
| JP | 2007-294199 | A | 11/2007 |
| JP | 2009-4291 | A | 1/2009 |
| JP | 4575693 | B2 | 11/2010 |
| JP | 2012-54153 | A | 3/2012 |
| JP | 2012-216365 | A | 11/2012 |

* cited by examiner

FUEL CELL SYSTEM AND METHOD FOR CONTROLLING SAME

TECHNICAL FIELD

The present invention relates to a fuel cell system and a method for controlling the same, which perform the control of a fuel cell at a low-temperature startup.

BACKGROUND ART

When starting up a fuel cell in a low temperature environment such as a subzero environment, there are performed a temperature rising control for raising the temperature of the fuel cell by using heat etc. generated through the power generation of the fuel cell and a low-temperature startup operation that includes a recovery operation for removing moisture inside the fuel cell (particularly, in the cathode). This recovery operation is performed in order to restrain the output performance of the fuel cell from being decreased due to a so-called flooding state.

As the recovery operation in such the low-temperature startup operation, JP4575693B2 proposes a fuel cell system that supplies dry air to a cathode at the time of the low-temperature startup of a fuel cell (hereinafter, also described as "dry air supply process") to vaporize moisture in the cathode and discharges the moisture into a cathode discharge flow channel.

SUMMARY OF INVENTION

Because the conventional technology has a configuration to raise ambient temperature (the temperature of the fuel cell and the temperature of dry air) to discharge moisture from the cathode to the outside by using dry air, it is necessary to raise the ambient temperature up to a certain level of temperature in order to perform the recovery operation.

Moreover, because it is not determined that the recovery operation has been completed as long as the ambient temperature is not raised to be not less than a constant temperature, the recovery operation from the start to the completion requires time and thus a time for the low-temperature startup operation is lengthened.

The present invention has been made in consideration of such a problem, and an object of the present invention is to provide a fuel cell system and a method for controlling the same, which can shorten a time for a low-temperature startup operation of a fuel cell.

Means for Solving the Problems

According to an aspect of the invention, in a fuel cell system comprising a fuel cell stack, it is determined whether an operating state of the fuel cell system is a low-temperature startup operation or a normal-running operation. a recovery control is executed for causing the concentration gradient adjusting apparatus to increase the concentration gradient of water in the electrolyte membrane to be larger than that in the normal-running operation when the operation determining unit determines that the operation state is the low-temperature startup operation

DESCRIPTION OF EMBODIMENTS

Hereinafter, exemplary embodiments of the present invention will be explained with reference to the accompanying drawings and the like.

First Embodiment

Figure 1:
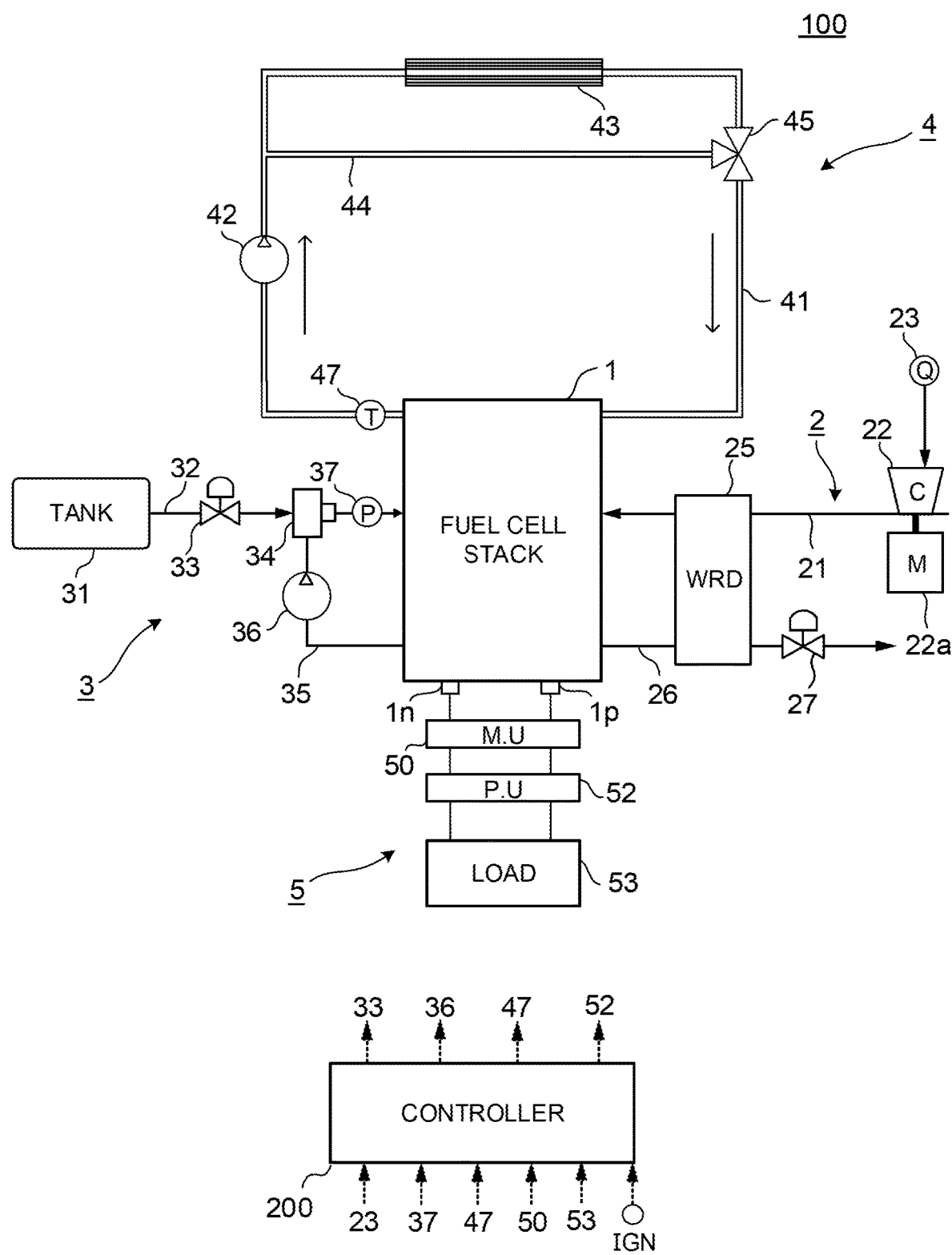
FIG. 1 is a diagram illustrating the configuration of a fuel cell system according to a first embodiment of the present invention.

FIG. 1 is a diagram illustrating an example of the configuration of a fuel cell system 100 according to the first embodiment.

The fuel cell system 100 illustrated in the drawing supplies anode gas (hydrogen) as fuel gas and cathode gas as oxidation gas (air) to a fuel cell stack 1 to perform power generation.

The fuel cell system 100 includes the fuel cell stack 1, a cathode gas supply/discharge apparatus 2, an anode gas supply/discharge apparatus 3, a stack cooling apparatus 4, an electric power system 5, and a control unit 200.

The fuel cell stack 1 is a stacked battery in which a plurality of fuel cells is stacked.

Each of the fuel cells is configured to have an anode (fuel electrode) and a cathode (oxidant electrode) while placing an electrolyte membrane therebetween. In the fuel cell, anode gas is supplied to the anode and cathode gas is supplied to the cathode to perform power generation by using these gases. A main electrochemical reaction proceeding during power generation in both electrodes of the anode and the cathode is as follows.

$$\text{Anode: } 2H_2 \rightarrow 4H^+ + 4e^- \quad (1)$$

$$\text{Cathode: } 4H^+ + 4e^- + O_2 \rightarrow 2H_2O \quad (2)$$

Hereinafter, the specific configuration of a fuel cell as a single cell will be explained.

Figure 2:
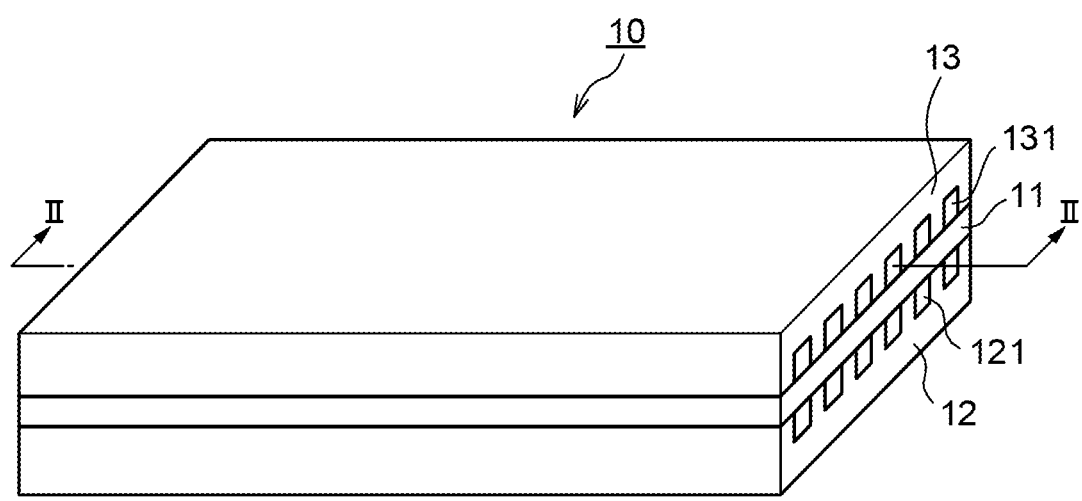
FIG. 2 is a perspective diagram of a fuel cell.
Figure 3:
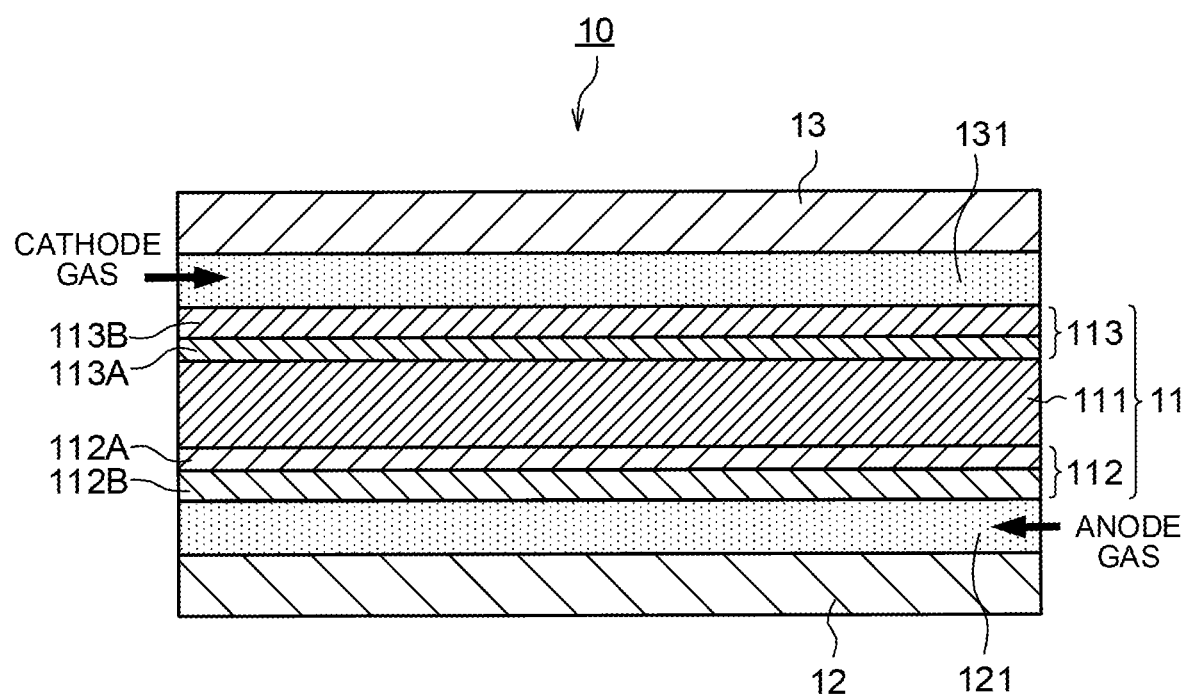
FIG. 3 is a cross-sectional diagram, viewed from the direction of II-II, of the fuel cell illustrated in FIG. 2.

FIGS. 2 and 3 are diagrams explaining the configuration of a fuel cell. FIG. 2 is a perspective diagram of a fuel cell 10 and FIG. 3 is a cross-sectional diagram, viewed from the direction of II-II, of the fuel cell 10 illustrated in FIG. 2.

As illustrated in the drawings, the fuel cell 10 includes a membrane electrode assembly (MEA) 11, and an anode separator 12 and a cathode separator 13 that are arranged to sandwich the membrane electrode assembly 11 therebetween.

The membrane electrode assembly 11 includes an electrolyte membrane 111, an anode 112, and a cathode 113. The membrane electrode assembly 11 has the anode 112 on one side and the cathode 113 on the other side of the electrolyte membrane 111.

The electrolyte membrane 111 is an ion exchange membrane having proton conductivity, which is formed of fluorinated resin. The electrolyte membrane 111 shows good electrical conductivity in a wet state.

The anode 112 includes an anode catalyst layer 112A and a gas diffusion layer 112B. The anode catalyst layer 112A includes catalytic materials consisting of carbon black particles (carbon carrier) carrying platinum and the like and an electrolyte (hereinafter, also described as "anode electrolyte") present between the catalytic materials. Holes (hereinafter, also described as "anode holes") are formed in portions in which these catalytic materials and anode electrolyte are not present. Furthermore, the anode catalyst layer 112A is provided to contact with the electrolyte membrane 111.

The gas diffusion layer 112B is placed outside the anode catalyst layer 112A. The gas diffusion layer 112B is a member formed of carbon cloth having gas diffusibility and electrical conductivity, and is provided to contact with the anode catalyst layer 112A and the anode separator 12.

Similarly to the anode 112, the cathode 113 includes a cathode catalyst layer 113A and a gas diffusion layer 113B. The cathode catalyst layer 113A is placed between the electrolyte membrane 111 and the gas diffusion layer 113B, and the gas diffusion layer 113B is placed between the cathode catalyst layer 113A and the cathode separator 13.

Similarly to the anode catalyst layer 112A, the cathode catalyst layer 113A includes catalytic materials consisting of carbon black particles (carbon carrier) carrying platinum and the like and an electrolyte (hereinafter, also described as "cathode electrolyte") present between the catalytic materials. Holes (hereinafter, also described as "cathode holes") are formed in portions in which these catalytic materials and cathode electrolyte are not present.

The anode separator 12 is placed outside the gas diffusion layer 112B. The anode separator 12 includes a plurality of anode flow channels 121 for supplying anode gas to the anode 112. The anode flow channels 121 are formed as a groove-like passage.

The cathode separator 13 is placed outside the gas diffusion layer 113B. The cathode separator 13 includes a plurality of cathode flow channels 131 for supplying cathode gas to the cathode 113. The cathode flow channels 131 are formed as a groove-like passage.

The anode separator 12 and the cathode separator 13 are configured so that the flow direction of anode gas flowing through the anode flow channels 121 and the flow direction of cathode gas flowing through the cathode flow channels 131 are opposite to each other. On the other hand, the anode separator 12 and the cathode separator 13 may be configured so that the flow directions of these gases are the same direction.

The fuel cell stack 1 is configured by stacking a plurality of the fuel cells 10.

Returning to FIG. 1, the cathode gas supply/discharge apparatus 2 functioning as an oxidation gas adjusting apparatus is an apparatus that supplies cathode gas to the fuel cell stack 1 and discharges cathode offgas from the fuel cell stack 1 to the atmospheric air.

The cathode gas supply/discharge apparatus 2 includes a cathode gas supply passage 21, a compressor 22, an air flow meter 23, a water recovery device (hereinafter, called "WRD") 25, a cathode offgas discharge passage 26, and a cathode gas pressure adjusting valve 27.

The cathode gas supply passage 21 is a passage for supplying cathode gas to the cathode flow channels 131 in the fuel cell stack 1. One end of the cathode gas supply passage 21 is opened and the other end is connected to an inlet of the cathode 113 of the fuel cell stack 1.

The compressor 22 sucks the cathode gas into the fuel cell system 100. The compressor 22 is provided on an open end corresponding to one end of the cathode gas supply passage 21.

The compressor 22 is a turbo type compressor or a positive displacement compressor that is driven by a compressor motor 22a. The compressor 22 sucks air acting as the cathode gas from the open end of the cathode gas supply passage 21 and supplies the air to the fuel cell stack 1 via the cathode gas supply passage 21. Moreover, the rotation speed of the compressor motor 22a, namely, the output of the compressor 22 is controlled by the control unit 200.

The air flow meter 23 is provided in an inlet of the compressor 22. The air flow meter 23 detects a flow rate of the cathode gas to be sucked by the compressor 22, namely, a flow rate of the cathode gas to be supplied to the fuel cell stack 1.

Hereinafter, the flow rate of the cathode gas to be supplied to the fuel cell stack 1 is also described as a "cathode-gas supply flow rate". Then, the air flow meter 23 outputs the detected value of the cathode-gas supply flow rate to the control unit 200.

The water recovery device 25 is provided across the cathode gas supply passage 21 and the cathode offgas discharge passage 26. The water recovery device 25 recovers moisture in the cathode offgas flowing into the cathode offgas discharge passage 26, and humidifies the cathode gas in the cathode gas supply passage 21 by using the recovered moisture. In other words, cathode gas humidified by the water recovery device 25 is supplied to the fuel cell stack 1.

The cathode offgas discharge passage 26 is a passage for releasing the cathode offgas discharged from the cathode flow channels 131 in the fuel cell stack 1 to the outside. One end of the cathode offgas discharge passage 26 is connected to an outlet of the cathode 113 of the fuel cell stack 1, and the other end is opened.

The cathode gas pressure adjusting valve 27 adjusts the pressure of the cathode gas to be supplied to the fuel cell stack 1. The cathode gas pressure adjusting valve 27 is provided in the cathode offgas discharge passage 26 on the downstream side of the water recovery device 25. The cathode gas pressure adjusting valve 27 is controlled to be opened or closed by the control unit 200. As a result, the pressure of the cathode gas to be supplied to the fuel cell stack 1 is adjusted to a desired pressure.

The anode gas supply/discharge apparatus 3 includes a high-pressure tank 31, an anode gas supply passage 32, an anode gas pressure adjusting valve 33, an ejector 34, an anode gas circulation passage 35, an anode gas circulation blower 36, and an anode gas pressure sensor 37.

The high-pressure tank 31 stores therein anode gas to be supplied to the fuel cell stack 1 while keeping it in a high-pressure state.

The anode gas supply passage 32 is a passage for supplying the anode gas stored in the high-pressure tank 31 to the fuel cell stack 1. One end of the anode gas supply passage 32 is connected to the high-pressure tank 31, and the other end is connected to the anode gas circulation passage 35 via the ejector 34.

The anode gas pressure adjusting valve 33 is provided in the anode gas supply passage 32 between the high-pressure tank 31 and the ejector 34. The opening degree of the anode gas pressure adjusting valve 33 is adjusted by the control unit 200 so as to adjust the pressure of the anode gas to be supplied to the fuel cell stack 1.

The ejector 34 is provided in the anode gas supply passage 32 between the anode gas pressure adjusting valve 33 and the fuel cell stack 1. The ejector 34 is a device that circulates anode gas within the anode gas circulation passage 35 by using a negative pressure when the anode gas is speeded up by a nozzle not illustrated and is supplied.

The anode gas circulation passage 35 is a circulation path that is connected to the anode gas supply passage 32 via a suction port of the ejector 34 and communicates with the anode flow channels 121 in the fuel cell stack 1 to circulate the anode gas.

The anode gas circulation blower 36 is provided in the anode gas circulation passage 35 on the upstream side of the ejector 34. The anode gas circulation blower 36 circulates the anode gas within the anode gas circulation passage 35 via the ejector 34. The rotation speed of the anode gas circulation blower 36 is controlled by the control unit 200.

The anode gas pressure sensor 37 is provided in the anode gas circulation passage 35 between the ejector 34 and the fuel cell stack 1. The anode gas pressure sensor 37 detects the pressure of the anode gas to be supplied to the fuel cell stack 1. The anode gas pressure sensor 37 outputs the detected value of the anode gas pressure to the control unit 200.

Although it is not illustrated in FIG. 1, the anode gas supply/discharge apparatus may include a purge passage that discharges to the outside impurities (nitrogen gas, water produced by power generation, etc.) in the anode gas that circulates through the anode gas circulation passage 35.

The stack cooling apparatus 4 is an apparatus that controls the temperature of the fuel cell stack 1. The stack cooling apparatus 4 includes a cooling water circulation passage 41, a cooling water pump 42, a radiator 43, a cooling water bypass passage 44, a three-way valve 45, and a water temperature sensor 47.

The cooling water circulation passage 41 is a passage for circulating cooling water to the fuel cell stack 1. One end of the cooling water circulation passage 41 is connected to a cooling water inlet hole of the fuel cell stack 1 and the other end is connected to a cooling water outlet hole of the fuel cell stack 1.

The cooling water pump 42 is provided in the cooling water circulation passage 41. The cooling water pump 42 supplies cooling water to the fuel cell stack 1 via the radiator 43. In addition, the rotation speed of the cooling water pump 42 is controlled by the control unit 200.

The radiator 43 is provided in the cooling water circulation passage 41 on the downstream side of the cooling water pump 42. The radiator 43 cools the cooling water warmed inside the fuel cell stack 1 by using a fan.

The cooling water bypass passage 44 is a passage bypassing the radiator 43, and returns cooling water discharged from the fuel cell stack 1 to the fuel cell stack 1 to circulate the cooling water. One end of the cooling water bypass passage 44 is connected between the cooling water pump 42 and the radiator 43 in the cooling water circulation passage 41, and the other end is connected to the three-way valve 45.

The three-way valve 45 is realized by a thermostat, for example. The three-way valve 45 adjusts a flow rate of cooling water that bypasses the radiator 43 by adjusting its opening degree. The three-way valve 45 is provided in a portion in which the cooling water bypass passage 44 joins the cooling water circulation passage 41 between the radiator 43 and the cooling water inlet hole of the fuel cell stack 1.

The water temperature sensor 47 is provided in the cooling water circulation passage 41 near a cooling water outlet of the fuel cell stack 1. The water temperature sensor 47 detects the temperature of the cooling water discharged from the fuel cell stack 1. Moreover, the water temperature sensor 47 outputs the detected value of the cooling water temperature to the control unit 200. In addition, in the present embodiment, this cooling water temperature corresponds to a stack temperature Ts that is the temperature of the fuel cell stack 1.

The electric power system 5 includes a current/voltage measuring unit 50, a power unit 52, and a loading device 53.

The current/voltage measuring unit 50 detects a current taken out from the fuel cell stack 1 by the power unit 52 etc. Hereinafter, a current taken out from the fuel cell stack 1 is also described as a "stack current".

Moreover, the current/voltage measuring unit 50 detects a voltage between terminals that is a voltage between a positive terminal 1$p$ and a negative terminal 1$n$. Hereinafter, a voltage between terminals of the fuel cell stack 1 is also described as a "stack voltage".

Furthermore, in the present embodiment, the current/voltage measuring unit 50 can also detect a voltage (hereinafter, also described as "cell voltage") of each of the fuel cells 10 that constitutes the fuel cell stack 1.

Then, the current/voltage measuring unit 50 outputs to the control unit 200 the detected values of the stack current and the stack voltage and the detected value of the cell voltage if needed.

The power unit 52 is placed between the fuel cell stack 1 and the loading device 53 to adjust the stack voltage.

Specifically, the power unit 52 includes: a DC/DC converter as a bidirectional voltage converter that increases and decreases the stack voltage; an inverter that performs DC/AC conversion on electric power that is input and output between the fuel cell stack 1 or a battery not illustrated and the loading device 53; and the like.

The loading device 53 includes, for example, an electric motor for driving a vehicle, a control unit for controlling the electric motor, an auxiliary machine for assisting the power generation of the fuel cell stack 1, a battery for accumulating power generated by the fuel cell stack 1, and the like. Herein, the auxiliary machine of the fuel cell stack 1 includes, for example, the compressor 22, the anode gas circulation blower 36, the cooling water pump 42, and the like.

Moreover, a control unit not illustrated that controls the loading device 53 outputs electric power required for the actuation of the loading device 53 to the control unit 200 as required power (requested load) for the fuel cell stack 1. For example, the control unit outputs the requested load so that the requested load for the fuel cell stack 1 becomes higher as the depression amount of an accelerator pedal provided in the vehicle becomes larger.

The control unit 200 is configured by a microcomputer, which includes a central processing unit (CPU), a read-only memory (ROM), a random-access memory (RAM), and an input-output interface (I/O interface), and functions as a controller.

In particular, the control unit 200 in the present embodiment receives input signals from the loading device 53 and various sensors such as "the air flow meter 23, the anode gas pressure sensor 37, the water temperature sensor 47, and the current/voltage measuring unit 50", and an ON signal of an ignition switch of the vehicle equipped with the fuel cell system 100.

Moreover, the control unit 200 that receives a signal of the requested load from the control unit of the loading device 53 computes a requested output current (hereinafter, also described as "load request current"), which is an output current required for the fuel cell stack 1, from the requested load on the basis of the current-voltage (IV) characteristics of the fuel cell stack 1.

Thus, the control unit 200 basically functions as a current adjusting unit that controls the power unit 52 so that the detected value of the stack current obtained by the current/voltage measuring unit 50 approaches the load request current.

Furthermore, the control unit 200 estimates an anode-gas supply flow rate, which is the flow rate of the anode gas to be supplied to the fuel cell stack 1, from the detected value of the anode gas pressure of the anode gas pressure sensor 37 and the detected value of the rotation speed of the anode gas circulation blower 36.

Thus, the control unit 200 basically functions as an anode-gas flow-rate adjusting unit that controls the opening degree of the anode gas pressure adjusting valve 33 of the anode gas supply/discharge apparatus 3, the output of the anode gas circulation blower 36, and the like, in such a manner that the estimated anode-gas supply flow rate approaches a requested anode-gas supply flow rate according to the load request current.

Moreover, the control unit 200 basically controls the output of the compressor 22 of the cathode gas supply/discharge apparatus 2, and the like, in such a manner that the detected value of the cathode-gas supply flow rate obtained by the air flow meter 23 approaches a requested cathode-gas supply flow rate according to the load request current.

The control unit 200 according to the present embodiment functions as an operation determining unit that determines whether the operating state of the fuel cell system 100 is an operation at a low-temperature startup (hereinafter, also described as "low-temperature startup operation") or an operation at a normal running (hereinafter, also described as "normal-running operation").

Furthermore, during recovery control of the low-temperature startup operation to be explained in detail later, the control unit 200 according to the present embodiment sets a recovery-control target output current as the target value of a stack current instead of the load request current. Then, during the recovery control, the control unit 200 controls the power unit 52 so that the detected value of the stack current obtained by the current/voltage measuring unit 50 approaches the recovery-control target output current. In addition, in the present embodiment, the recovery-control target output current is set to a value lower than the load request current.

Moreover, during the recovery control of the low-temperature startup operation, the control unit 200 sets a recovery-control target anode-gas supply flow rate as the target value of an anode-gas supply flow rate instead of the requested anode-gas supply flow rate. Then, during the recovery control, the control unit 200 controls the anode gas supply/discharge apparatus 3 so that the estimated value of the anode-gas supply flow rate approaches the recovery-control target anode-gas supply flow rate.

The control unit 200 according to the present embodiment receives the startup request (ON signal of Ignition (ION)) for the fuel cell stack 1. When receiving the ON signal of IGN, the control unit 200 determines whether the low-temperature startup operation is a required low temperature environment. When it is determined that it is the low temperature environment, the control unit 200 causes an actuator such as the power unit 52 to perform the low-temperature startup operation of the fuel cell stack 1. In other words, based on the reception of the IGN ON signal and the determination that it is the low temperature environment, the control unit 200 determines that the state of the fuel cell system 100 is the low-temperature startup operation.

In particular, in the present embodiment, as the low-temperature startup operation, the control unit 200 controls an actuator such as the power unit 52 and performs recovery control for increasing the concentration gradient of water of the electrolyte membrane 111 to be larger than the concentration gradient of water in the normal-running operation.

Hereinafter, the background art of recovery control performed by the fuel cell system 100 according to the present embodiment will be explained.

Figure 23:
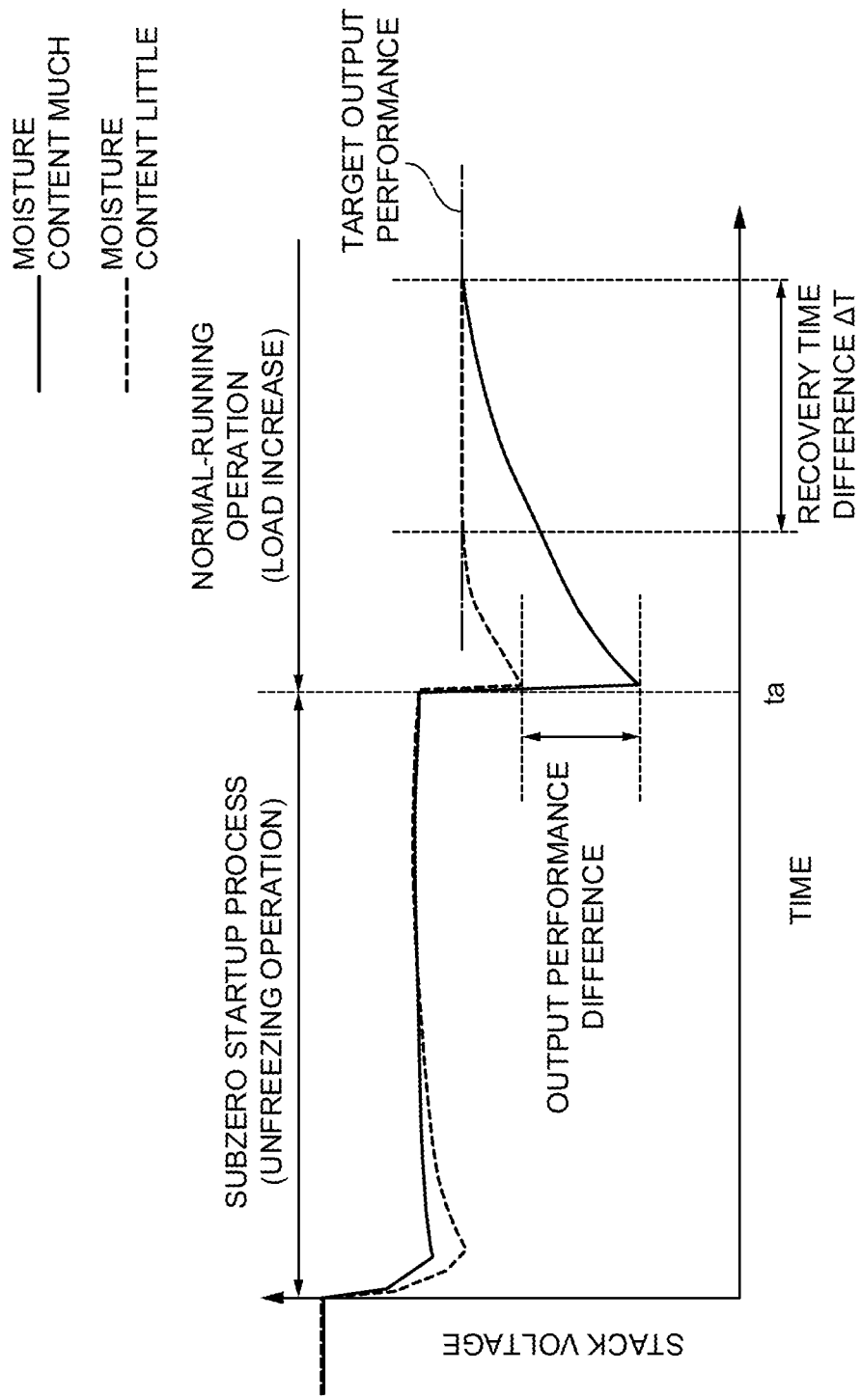
FIG. 23 is a diagram explaining the background art.

FIG. 23 is a diagram explaining the background art of the present embodiment.

Specifically, FIG. 23 illustrates the change in a stack voltage in a process for increasing a load (stack current) of the fuel cell stack 1 as the low-temperature startup operation of the fuel cell stack 1 at a low-temperature startup in order to transfer to an normal-running operation considered as a state in which the vehicle can travel from a subzero startup process (unfreezing operation) aimed at raising the temperature of the fuel cell stack 1. In addition, in the example illustrated in FIG. 23, the recovery control is not performed.

In the graph of FIG. 23, the change in a stack voltage when a moisture content in the cathode 113 is relatively much is illustrated with a solid line. On the other hand, the change in a stack voltage when a moisture content in the cathode 113 is relatively small is illustrated with a broken line.

Herein, the subzero startup process is a process for providing a certain degree of load to the fuel cell stack 1 under the low temperature environment to generate electric power and raising the temperature of the fuel cell stack 1 by using heat formed by the power generation. In addition, a heat source such as a PTC heater can be used as a fuel battery heating apparatus in accordance with a rate of temperature increase to be required.

In FIG. 23, the stack temperature Ts rises to about 0° C. at a time t0 and the subzero startup process of the fuel cell stack 1 is terminated. Therefore, the fuel cell system transfers to the normal-running operation at the time ta. Because the supply of power to a traveling motor is started particularly at the time ta at which the system transfers to the normal-running operation, the stack voltage decreases instantaneously.

Herein, as can be seen from the drawing, the case where a moisture content in the cathode 113 is relatively much has large voltage drop at the time ta at which the system transfers to the normal-running operation, compared to the case where a moisture content in the cathode 113 is relatively small.

As a result, the case where the moisture content in the cathode 113 is relatively much requires longer time until the fuel cell stack 1 is recovered to have a target output performance after the time ta at which the system transfers to the normal-running operation (see a recovery time difference ΔT of FIG. 23).

The fuel cell system 100 according to the present embodiment provides recovery control for immediately recovering the fuel cell stack 1 to a desired output performance in such a situation.

Hereinafter, the control of the fuel cell system 100 according to the present embodiment will be explained in more detail.

Figure 4:
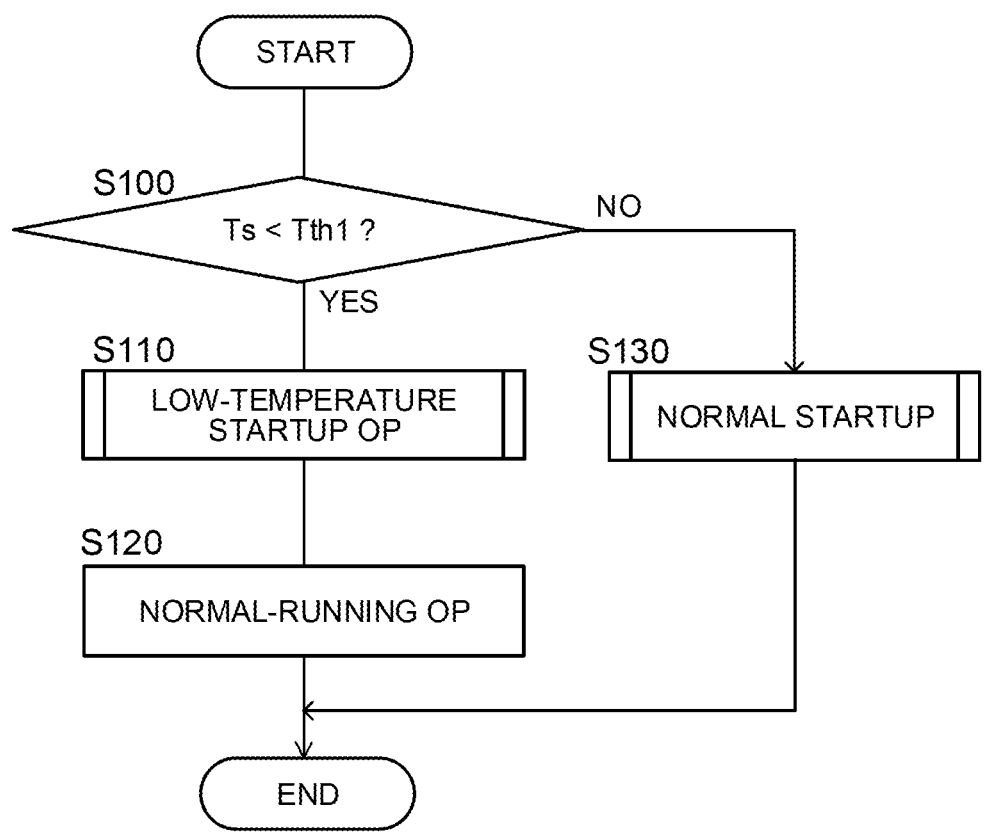
FIG. 4 is a flowchart explaining the flow of a process at the startup of the fuel cell system.

FIG. 4 is a flowchart explaining the flow of a process at the startup of the fuel cell system 100 according to the present embodiment.

In Step S100, in activating the fuel cell system 100, in order to determine whether it is necessary to execute the low-temperature startup operation on the fuel cell stack 1, the control unit 200 determines whether the stack temperature Ts is less than a low-temperature-startup operation execution reference temperature Tth1.

Herein, the low-temperature-startup operation execution reference temperature Tth1 is previously defined by an experiment etc. in consideration of the frozen state etc. of moisture in the fuel cell stack 1 as a temperature to be the criterion for determination for performing the low-temperature startup operation of the fuel cell stack 1. The low-temperature-startup operation execution reference temperature Tth1 can be set to 0° C., for example. Moreover, instead of the size determination between the stack temperature Ts and the low-temperature-startup operation execution reference temperature Tth1, the control unit 200 may determine the size between the low-temperature-startup operation execution reference temperature Tth1 and the temperature detection value of an outdoor temperature sensor (not illustrated) etc. provided in the fuel cell system 100.

Then, when it is determined that the stack temperature Ts is less than the low-temperature-startup operation execution reference temperature Tth1, the control unit 200 executes the low-temperature startup operation in Step S110.

Figure 5:
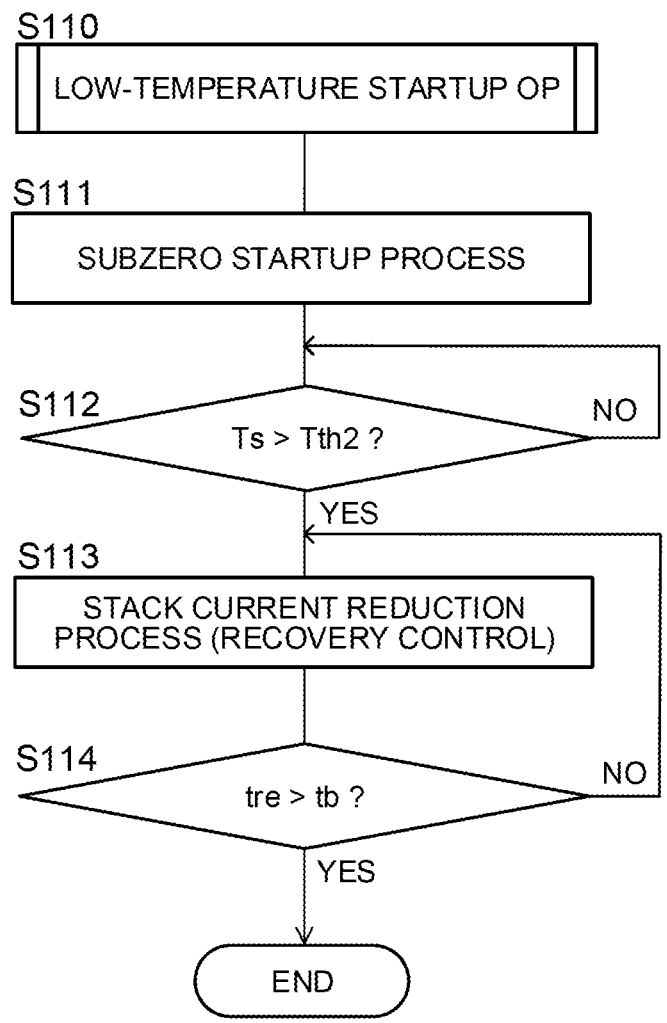
FIG. 5 is a flowchart explaining the flow of a low-temperature startup operation according to the first embodiment.

FIG. 5 is a flowchart explaining the flow of the low-temperature startup operation according to the present embodiment.

In Step S111, the control unit 200 first executes the subzero startup process. As already explained above, the subzero startup process is a process for making the fuel cell stack 1 generate electric power under a predetermined load to raise the temperature of the fuel cell stack 1.

In Step S112, the control unit 200 determines whether the stack temperature Ts is larger than a recovery-control execution reference temperature Tth2. Herein, the recovery-control execution reference temperature Tth2 is a temperature defined from a viewpoint of whether the fuel cell stack is in an appropriate state to execute recovery control to be described later by progressing a certain level of unfreezing in the fuel cell stack 1 by using the subzero startup process.

It is preferable that the recovery-control execution reference temperature Tth2 is set to a temperature that is not less than 0° C. at which the unfreezing in the fuel cell stack 1 is progressed to some extent and is not too high from the viewpoint of preventing the prolongation of the low-temperature startup operation. For example, the recovery-control execution reference temperature Tth2 is set to 0° C.

Then, when it is determined that the stack temperature Ts is larger than the recovery-control execution reference temperature Tth2, the control unit 200 executes a stack current reduction process that is recovery control according to the present embodiment in Step S113.

In the stack current reduction process, the requested load at the subzero startup is maintained or a requested load lower than that load is set. Furthermore, in the stack current reduction process, the stack current is adjusted to be lower than the load request current according to the set requested load. In other words, a target output current (recovery-control target output current) during the stack current reduction process is set to be lower than a basic target value (load request current) employed in the normal-running operation etc. of the fuel cell stack 1.

Specifically, the control unit 200 sets a recovery-control target output current lower than the load request current corresponding to the request of the loading device 53, and controls the power unit 52 so that the stack current approaches the recovery-control target output current. As a result, the stack current is adjusted by the power unit 52 to be decreased up to this recovery-control target output current.

On the other hand, in the present embodiment, the control unit 200 sets a recovery-control target anode-gas supply flow rate higher than the requested anode-gas supply flow rate based on the load request current, and controls the anode gas supply/discharge apparatus 3 so that the anode-gas supply flow rate approaches the recovery-control target anode-gas supply flow rate.

Therefore, during the stack current reduction process, because the anode-gas supply flow rate is set to be higher than the requested anode-gas supply flow rate according to the load request current while the stack current becomes smaller than the load request current, the anode-gas supply flow rate becomes excessive with respect to an actual stack current.

On the other hand, it is considered that electric power to be met with respect to the request of a load is insufficient by making the stack current smaller than the load request current. However, the electric power insufficient for the request of this load can be supplemented by a battery (not illustrated) etc.

Next, in Step S114, the control unit 200 determines whether a duration time tre of the recovery control to count by using a timer (not illustrated) etc. exceeds a predetermined time tb. Herein, the predetermined time tb is previously defined by an experiment etc. as the lower limit of a time to continue the stack current reduction process to the extent that the output performance of the fuel cell stack 1 can be recovered to a desired performance.

Then, when it is determined that the duration time tre of the recovery control exceeds the predetermined time tb, the control unit 200 terminates the recovery control and moves the process to Step S120. On the other hand, when it is determined that the duration time tre of the stack current reduction process does not exceed the predetermined time tb, the control unit 200 continues to perform the recovery control.

Returning to FIG. 4, in Step S120, the control unit 200 transfers the fuel cell stack 1 to the normal-running operation. Specifically, in the normal-running operation, the supply of power to the traveling motor of the vehicle is started and the vehicle transfers to a travelable state.

Figure 6:
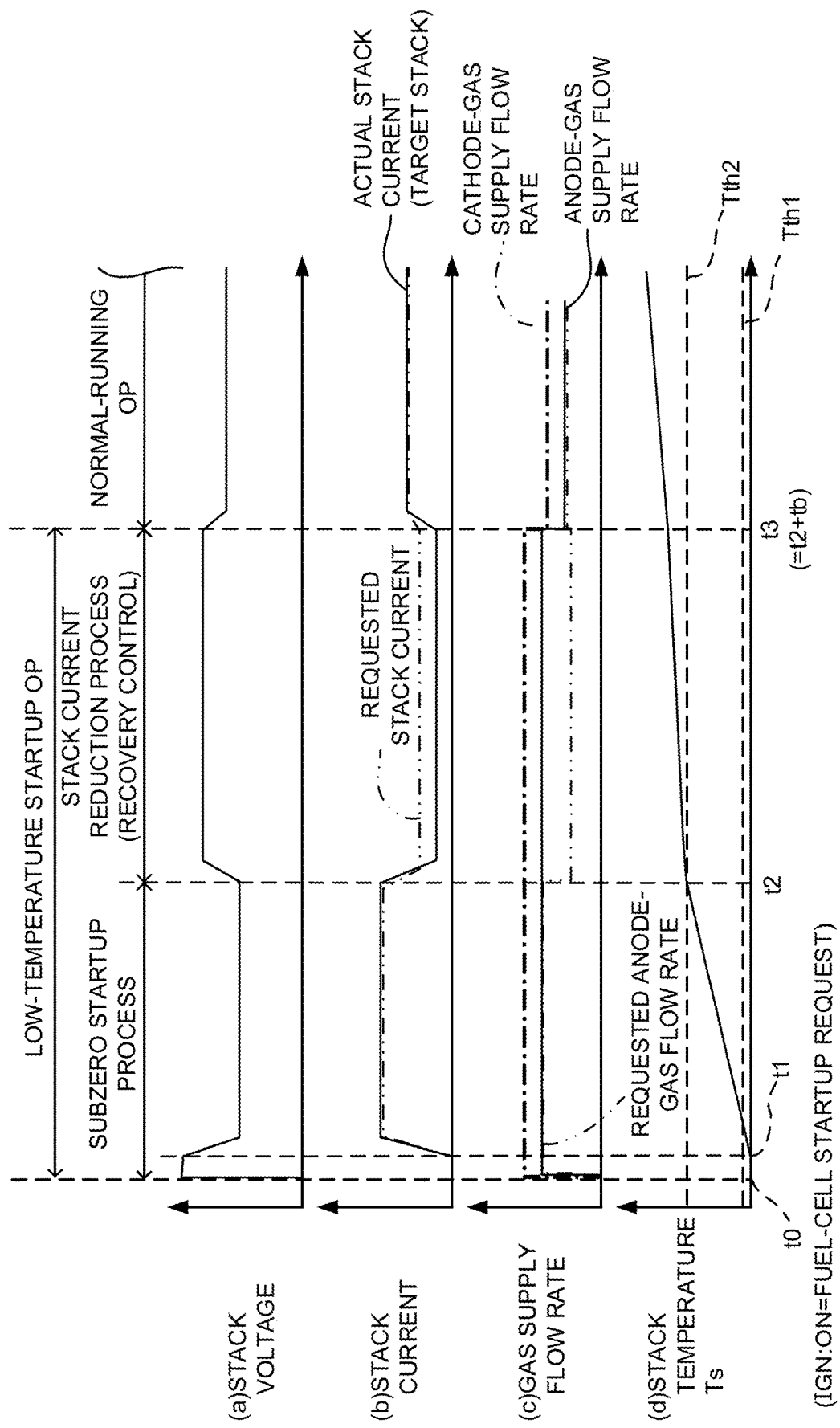
FIG. 6 is a timing chart explaining a temporal change from the low-temperature startup operation to the normal-running operation according to the first embodiment.

FIG. 6 is an example of a timing chart explaining a temporal change from the low-temperature startup operation to the normal-running operation of the fuel cell system 100 described above. Herein, the graph of FIG. 6(a) indicates the change in a stack voltage and the graph of FIG. 6(b) indicates the change in a stack current. Moreover, the graph of FIG. 6(c) indicates the changes in an anode-gas supply flow rate and a cathode-gas supply flow rate. Furthermore, the graph of FIG. 6(d) indicates the change in the stack temperature Ts.

At a time t0, the control unit 200 receives an ON signal (the startup request of the fuel cell stack 1) of the ignition switch, and detects that the stack temperature Ts falls below the low-temperature-startup operation execution reference temperature Tth1 (see: Yes of Step S100 and FIG. 6(d)). As a result, the control unit 200 determines that the fuel cell system 100 is in the low-temperature startup operation.

Then, in order to execute the subzero startup process of the low-temperature startup operation, the control unit 200 controls the compressor 22 etc. of the cathode gas supply/discharge apparatus 2 and the anode gas circulation blower 36 etc. of the anode gas supply/discharge apparatus 3 so as to start to supply anode gas and cathode gas to the fuel cell stack 1 (see: Steps S110 and S111 and FIG. 6(c)). Along with this, the stack voltage rises (FIG. 6(a)).

Next, at a time t1 at which the stack voltage is stabilized, the control unit 200 controls the power unit 52 to start to extract the current from the fuel cell stack 1. In other words, power generation of the fuel cell stack 1 according to the requested load is started, and the stack current increases (see: Step S111 and FIG. 6(b)). Along with this, the stack voltage decreases (see FIG. 6(a)). Then, the stack temperature Ts increases due to heat generated by power generation of the fuel cell stack 1.

Next, at a time t2, the stack temperature Ts arrives at the recovery-control execution reference temperature Tth2. Therefore, the control unit 200 starts the above stack current reduction process as the recovery control (see: Steps S112 and S113 and FIG. 6(b)). As already described, in the stack current reduction process, because the actual anode-gas supply flow rate becomes higher than the requested anode-gas supply flow rate even though the actual stack current becomes smaller than the load request current, the stack voltage rises (see FIG. 6(a)).

In the example of the stack current reduction process illustrated in FIG. 6 particularly, although the load request current itself decreases by the transition to the recovery control from the subzero startup process, the actual anode-gas supply flow rate (the recovery-control target anode-gas supply flow rate) is adjusted to the same value as the requested anode-gas supply flow rate at the time of the subzero startup process. In other words, even if the transition is performed from the subzero startup process to the stack current reduction process, the anode-gas supply flow rate is maintained without changing itself (see the solid line of FIG. 6(c)).

As a result, the anode-gas supply flow rate exceeds the requested anode-gas supply flow rate (see the dashed-two dotted line of FIG. 6(c)) during the stack current reduction process. In other words, when the transition is performed from the subzero startup process to the stack current reduction process, an anode-gas stoichiometric ratio increases, which is defined as a ratio of the actual anode-gas supply flow rate to the anode-gas supply flow rate required to realize the actual stack current (the recovery-control target output current).

Therefore, in the present embodiment, the stack current reduction process can decrease a water content of the anode catalyst layer 112A of the fuel cell stack 1, and can increase the concentration gradient of water in the electrolyte membrane 111 between the anode catalyst layer 112A and the cathode catalyst layer 113A to promote moisture transfer from the cathode catalyst layer 113A to the electrolyte membrane 111. As a result, moisture in the cathode catalyst layer 113A can be removed to recover the output performance of the fuel cell stack 1. In addition, the principle of this operational effect will be explained in detail later.

In the time chart illustrated in FIG. 6(c), the cathode-gas supply flow rate is set to a value tailored to the anode-gas supply flow rate. In other words, the actual cathode-gas supply flow rate is set to a high value as compared to a cathode-gas supply flow rate required to realize the recovery-control target output current, and also a cathode-gas stoichiometric ratio increases relatively. However, the actual cathode-gas supply flow rate may be adjusted to a lower value like setting it to a value required to realize the recovery-control target output current, for example.

Then, at a time t3, the duration time tre (=t3−t2) of the recovery control reaches the predetermined time tb. Therefore, the control unit 200 terminates the recovery control at the time t3, and transfers the fuel cell stack 1 to the normal-running operation (see Steps S114 and S120). Specifically, the control unit 200 terminates the stack current reduction process to respectively make the target value of the stack current and the target value of the anode-gas supply flow rate return to the load request current and the requested anode-gas supply flow rate. Similarly, the cathode-gas supply flow rate is also set to the requested cathode-gas supply flow rate according to the load request.

In the example of FIG. 6, because the load request current increases by transferring to the normal-running operation (see the dashed-two dotted line of FIG. 6(b)), the stack current increases by setting this load request current to the target output current as the control of the basic output current. As a result, the stack voltage decreases (see FIG. 6(a)). Moreover, in the normal-running operation, the anode-gas supply flow rate and the cathode-gas supply flow rate are adjusted so that the anode-gas stoichiometric ratio and the cathode-gas stoichiometric ratio are not less than one in accordance with the load request current along the basic flow control.

Next, there will be explained a principle by which the output performance of the fuel cell stack 1 is recovered through the stack current reduction process as the recovery control according to the present embodiment. In addition, the principle to be explained below is not necessarily intended to restrict the technical scope of the present invention.

Figure 7:
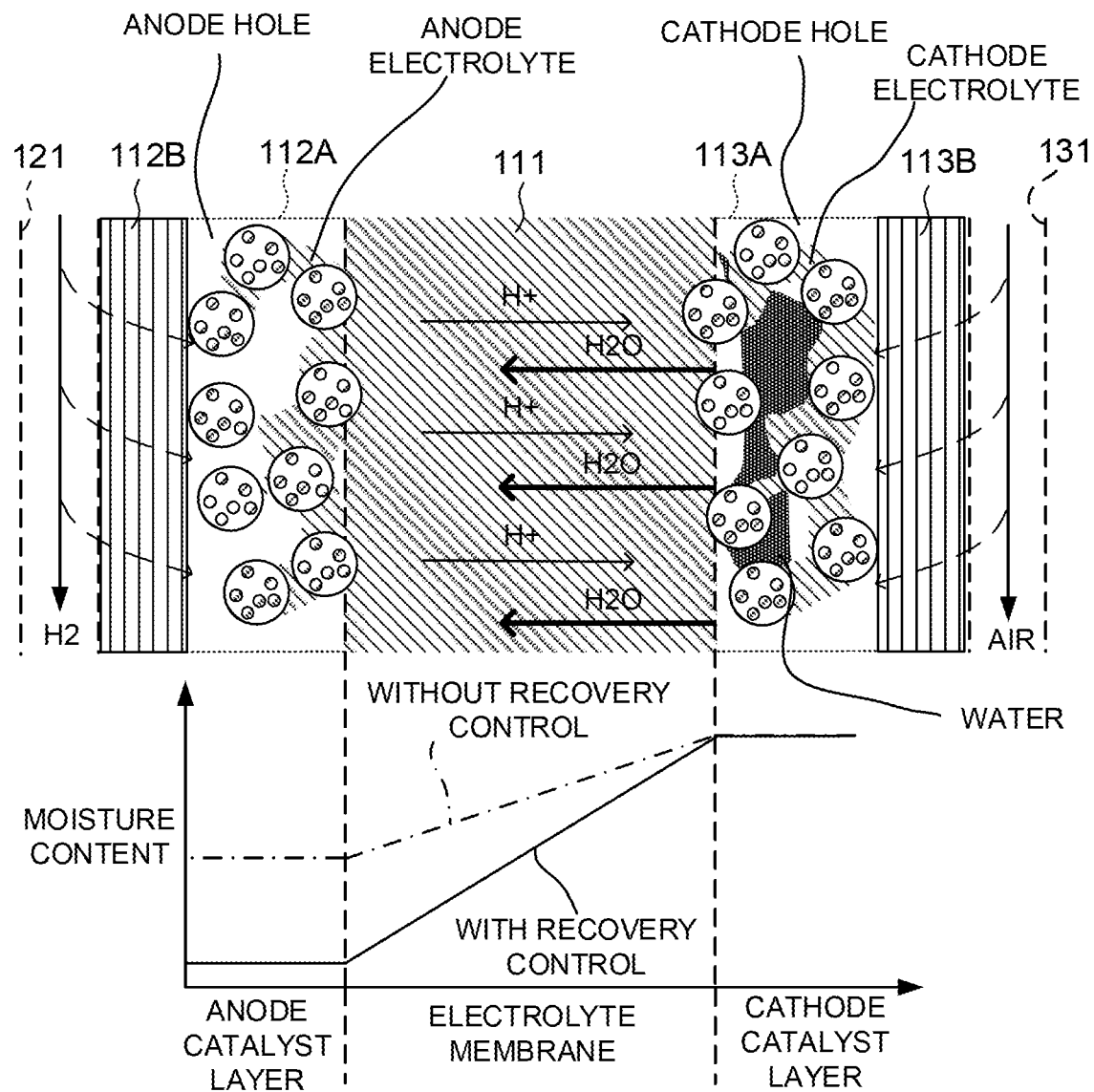
FIG. 7 is a diagram explaining an operational effect obtained by recovery control.

FIG. 7 is a diagram explaining an operational effect obtained by the recovery control according to the present embodiment. Specifically, FIG. 7 schematically illustrates the configuration of the catalyst layers 112A and 113A and the electrolyte membrane 111 in the fuel cell 10.

An operational effect obtained by the fuel cell system 100 according to the present embodiment is explained while comparing with the conventional dry air supply process proposed in JP4575693B2 etc.

Typically, humidification content of the water recovery device 25 and moisture coming from the produced water of power generation are contained in the cathode catalyst layer 113A. Particularly, moisture coming from the produced water of power generation is mainly contained in cathode holes and a cathode electrolyte. In this case, if the cathode holes contain much moisture, there is a possibility that so-called flooding blocking gas diffusion inside the cathode 113 occurs and the output performance of the fuel cell stack 1 decreases.

Therefore, in order to remove moisture inside such the cathode holes, the conventional dry air supply process supplies dry air to the cathode flow channels 131 to promote the evaporation of moisture inside the cathode holes and discharges the evaporated moisture into the cathode flow channels 131.

However, because the low-temperature startup operation is executed under the low temperature environment, the stack temperature Ts is low, the temperature of moisture present in the cathode holes is also low, and the temperature of dry air to be supplied is also low. Therefore, because the vapor pressure of the moisture present in the cathode holes is low and the saturated-water vapor pressure of the dry air itself is also low, an effect vaporizing moisture is low.

Moreover, because molecules that constitutes the dry air are mainly a nitrogen molecule, an oxygen molecule, etc. and their molecular weights are comparatively large, a diffusion effect in the cathode catalyst layer 113A is low. Therefore, because dry air is not sufficiently spread out in the cathode holes even if the dry air is supplied to the cathode flow channels 131, it is considered that an effect removing the moisture inside the cathode holes is low.

In view of such a conventional problem, as the result of diligent study, instead of a concept to discharge the moisture inside the cathode holes to the cathode flow channels 131 like the above dry air supply process, the present inventors have reached a new idea to remove the moisture inside the cathode holes by moving the moisture inside the cathode holes toward the electrolyte membrane 111.

Specifically, the present inventors have focused attention on a back-diffusion phenomenon (see the bold arrow in FIG. 7) that is a phenomenon in which moisture moves from the cathode catalyst layer 113A to the electrolyte membrane 111, due to a difference of the concentration gradient of water between the anode catalyst layer 112A and the cathode catalyst layer 113A, in removing the moisture inside the cathode holes.

The back-diffusion phenomenon will be explained in more detail.

As illustrated in FIG. 7, anode gas is supplied to the anode catalyst layer 112A via the anode flow channel 121 and the gas diffusion layer 112B. Although some moisture coming from moisture inside this anode gas is contained in the anode catalyst layer 112A, water produced by power generation is not substantially contained in the anode catalyst layer 112A.

Moreover, the moisture inside the anode holes of the anode catalyst layer 112A generally moves toward the electrolyte membrane 111 along with a proton H+ in accordance with the electrochemical reaction of the fuel cell 10. Therefore, in the anode 112, moisture substantially only exists inside only the anode electrolyte. In other words, the moisture contained in the anode catalyst layer 112A is small compared to the moisture contained in the cathode catalyst layer 113A.

On the other hand, because water produced by power generation is present in the cathode 113, the cathode 113 contains moisture more than the anode 112 and this moisture is accumulated in the cathode holes etc. of the cathode catalyst layer 113A.

Due to a difference of moisture content between the anode catalyst layer 112A and the cathode catalyst layer 113A described above, the concentration gradient of water is caused between the anode catalyst layer 112A and the cathode catalyst layer 113A (see the dashed-dotted-line graph of FIG. 7). Herein, the concentration gradient of water according to the present embodiment is given as a ratio of a moisture content contained in the cathode catalyst layer 113A to a moisture content contained in the anode catalyst layer 112A. As a result, a back-diffusion phenomenon occurs in which the moisture inside the cathode holes moves toward the electrolyte membrane 111 (see the bold arrow of the drawing).

The present inventors have focused attention on this back-diffusion phenomenon and have reached the concept that this back-diffusion phenomenon is promoted in the low-temperature startup operation of the fuel cell stack 1 and thus the moisture inside the cathode holes is moved toward the electrolyte membrane 111 and is efficiently removed by executing recovery control for increasing the concentration gradient of water in the low-temperature startup operation to be larger than the concentration gradient of water in the normal-running operation.

In the present embodiment, a process for decreasing a water content in the anode 112 is performed as one means for promoting such a back-diffusion phenomenon. More specifically, the control unit 200 sets a recovery-control target output current lower than a load request current, and executes the stack current reduction process (see: Step S113 of FIG. 5 and time t2 to time t3 of FIG. 6(b)) for controlling the power unit 52 in such a manner that a stack current approaches this recovery-control target output current during the recovery control.

By executing such the recovery control, the actual anode-gas supply flow rate becomes excessive with respect to the stack current. In other words, the flow rate of anode gas to be supplied to the anode catalyst layer 112A from the anode flow channel 121 via the gas diffusion layer 112B becomes higher than the request of power generation, and thus the surplus anode gas remaining without being consumed by power generation increases. Therefore, because the surplus anode gas diffuses into the anode electrolyte, moisture is removed by the anode gas from inside the anode electrolyte.

As a result, because a moisture content in the anode catalyst layer 112A decreases, the concentration gradient of water between the anode catalyst layer 112A and the cathode catalyst layer 113A increases (see the solid-line graph of FIG. 7). Therefore, the action of the back-diffusion phenomenon is promoted.

Particularly, because a principal component of the anode gas is hydrogen having small molecular weight, a diffusion effect inside the anode catalyst layer 112A is high as compared to the cathode gas including nitrogen and oxygen as principal components. Furthermore, because moisture is not substantially contained in the anode holes of the anode catalyst layer 112A as described above, the anode gas diffuses through the anode holes without being blocked by moisture.

Consequently, the effect of diffusing the anode gas into the anode electrolyte is high and thus the moisture in the anode electrolyte can be efficiently removed. Furthermore, as described above, an amount of moisture contained inside the anode catalyst layer 112A originally is smaller than an amount of moisture contained inside the cathode catalyst layer 113A. Therefore, the removal of moisture inside the anode electrolyte performed by the recovery control can be more effectively performed as compared to the case of removing moisture inside the cathode catalyst layer 113A.

Next, there will be explained the size of superiority according to the stack temperature Ts between the evaporation of moisture from the cathode catalyst layer 113A to the cathode flow channels 131 performed by the conventional dry air supply process and the movement of moisture from the cathode catalyst layer 113A to the electrolyte membrane 111 performed by the recovery control.

Figure 8:
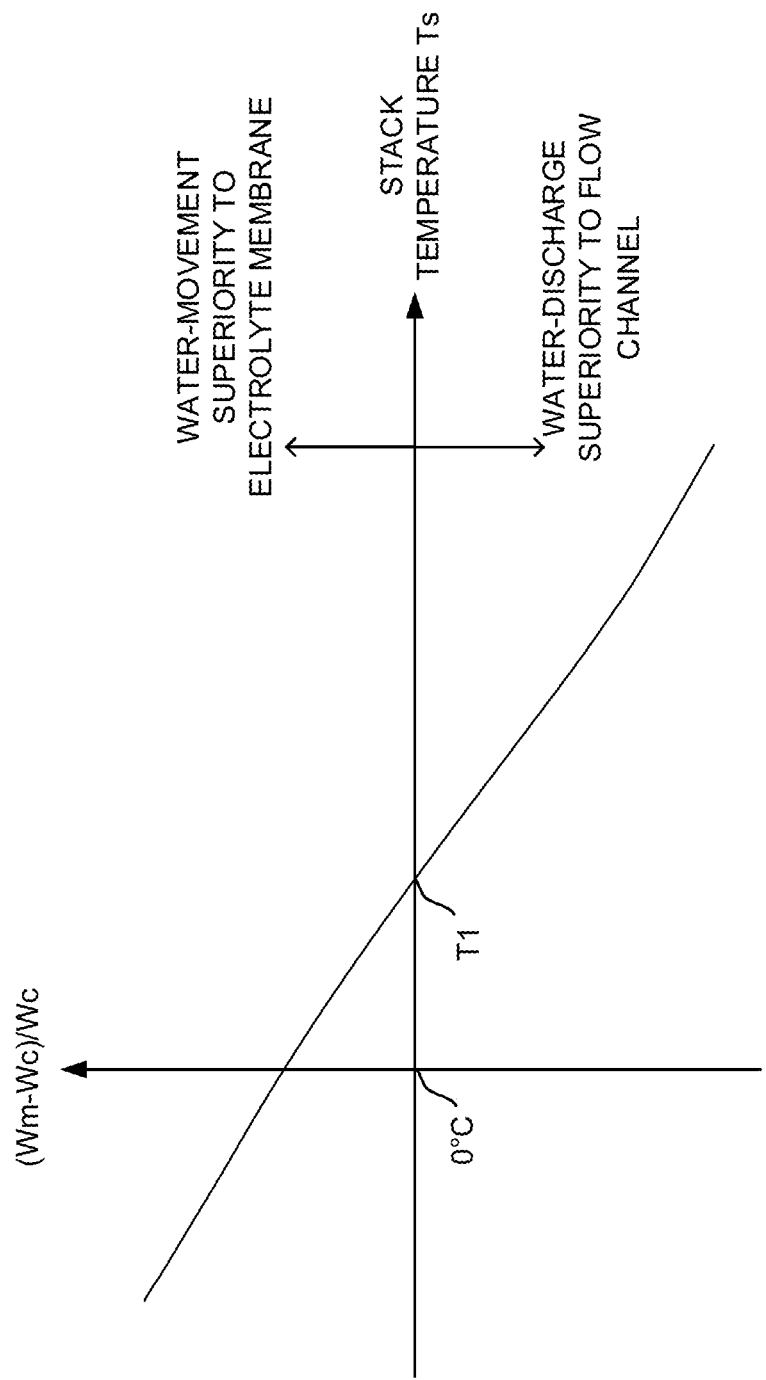
FIG. 8 is a graph explaining the relationship of superiority between a moisture movement amount to an electrolyte membrane and a moisture evaporation amount to a cathode flow channel according to a stack temperature.

FIG. 8 is a graph explaining a relationship between a moisture content (hereinafter, also described as "movement moisture content Wm") moving from the cathode catalyst layer 113A to the electrolyte membrane 111 and a moisture content (hereinafter, also described as "evaporation moisture content Wc") evaporating from the cathode catalyst layer 113A to the cathode flow channels 131, which are according to the stack temperature Ts.

In FIG. 8, its horizontal axis is the stack temperature Ts and its vertical axis is a dimensionless quantity that is defined by (Wm−Wc)/Wc. In other words, the value of the vertical axis is a value that indicates how large the movement moisture content Wm is with respect to the evaporation moisture content Wc.

The area in which the value of the vertical axis is a positive, namely, the vertical axis>0 in the graph of FIG. 8 is an area (hereinafter, also described as "water movement superiority area") in which the movement moisture content Wm is larger than the evaporation moisture content Wc. Therefore, in this water movement superiority area, the movement of water from the cathode catalyst layer 113A to the electrolyte membrane 111 dominantly occurs as compared to the evaporation of water from the cathode catalyst layer 113A to the cathode flow channels 131.

On the other hand, the area in which the value of the vertical axis is a negative, namely, the vertical axis<0 in the graph of FIG. 8 is an area (hereinafter, also described as "flow-channel evaporation superiority area") in which the movement moisture content Wm is smaller than the evaporation moisture content Wc. Therefore, in this flow-channel evaporation superiority area, the evaporation of water from the cathode catalyst layer 113A to the cathode flow channels 131 dominantly occurs with respect to the movement of water from the cathode catalyst layer 113A to the electrolyte membrane 111.

In addition, in the area in which the value of the vertical axis is zero, namely, the vertical axis=zero in the graph of FIG. 8, the movement moisture content Wm is the same as the evaporation moisture content Wc. In this case, the movement amount of water from the cathode catalyst layer 113A to the electrolyte membrane 111 is substantially equal to the evaporation amount of water from the cathode catalyst layer 113A to the cathode flow channels 131.

Referring to FIG. 8, it turns out that an area of "the stack temperature Ts>T1" is the flow-channel evaporation superiority area and an area of "the stack temperature Ts<T1" is the water movement superiority area. Herein, it is known that the value of T1 is a value near approximately 25° C. although the value has slight width depending on experimental conditions etc. Therefore, hereinafter, explanations will be made assuming that it is T1≅25° C.

As illustrated in FIG. 8, the area of "the stack temperature Ts<25° C." assumed as the execution environment of the low-temperature startup operation is the water movement superiority area. Therefore, the conventional dry air supply process requires to raise the stack temperature Ts up to at least 25° C. in order to achieve a water removal effect equivalent to the recovery control according to the present embodiment. However, raising the stack temperature Ts so far requires suitable time even if heating is performed by using a heater etc. in addition to heat produced by power generation of the fuel cell stack 1.

On the contrary, as already described, because the area of "the stack temperature Ts<25° C." under the execution environment of the low-temperature startup operation is in the water movement superiority area, the movement of water from the cathode catalyst layer 113A to the electrolyte membrane 111 according to the recovery control of the present embodiment can realize clearly effectively moisture removal from the cathode catalyst layer 113A in comparison with the discharge of moisture caused by the evaporation to the cathode flow channels 131.

As described above, the present inventors have focused attention on a back-diffusion phenomenon that is a phenomenon in which water moves from the cathode catalyst layer 113A to the electrolyte membrane 111, and have found that the movement of water caused by the back-diffusion phenomenon under the low temperature environment has superiority with respect to the discharge of moisture caused by the evaporation to the cathode flow channels 131.

Furthermore, the present inventors have reached a breakthrough concept that the recovery control according to the present embodiment increases the concentration gradient of water of the electrolyte membrane to be larger than that in the normal-running operation to promote the back-diffusion phenomenon even under the low temperature environment, and consequently can more efficiently execute the removal of moisture from the cathode catalyst layer 113A than the conventional method and can contribute to the efficient recovery of the output performance of the fuel cell stack 1.

Figure 9:
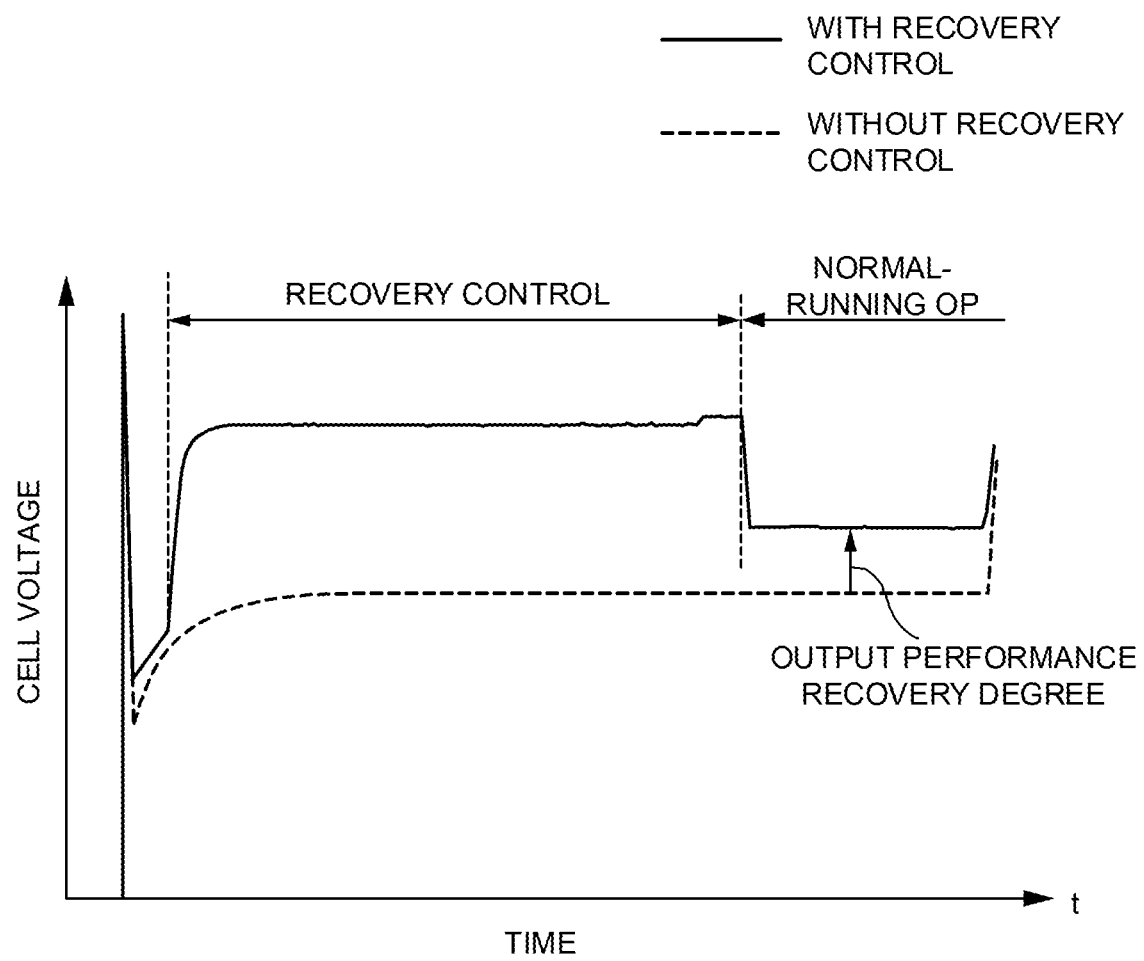
FIG. 9 is a graph explaining the recovery effect of output performance obtained by the recovery control according to the present embodiment.

FIG. 9 is a graph explaining the recovery effect of the output performance obtained by the recovery control according to the present embodiment. Specifically, FIG. 9 illustrates a time change in a cell voltage during the low-temperature startup operation.

The broken-line graph illustrated in FIG. 9 illustrates the change in the cell voltage when not executing the recovery control according to the present embodiment. On the other hand, the solid-line graph illustrated in FIG. 9 illustrates the change of the cell voltage when executing the recovery control according to the present embodiment.

As already explained above, the recovery control according to the present embodiment is a process for increasing the actual anode-gas supply flow rate to be not less than the requested anode-gas flow rate while decreasing the stack current. Therefore, as is apparent from FIG. 9, the cell voltage of the solid-line graph during the recovery control becomes higher as compared to the broken-line graph without executing the recovery control.

Then, when the recovery control is terminated, the operating state transfers to the normal-running operation of the fuel cell stack 1. Herein, in the normal-running operation, even though the load request current of the normal-running operation is controlled as a target output current in any cases where the recovery control is executed and is not executed, the cell voltage when the recovery control is executed becomes clearly higher as compared to the cell voltage when the recovery control is not executed. In other words, this indicates that the output performance of the fuel cell stack 1 has been recovered by the recovery control according to the present embodiment.

The fuel cell system 100 described above according to the present embodiment has the following operational effect.

The fuel cell system 100 according to the present embodiment includes the fuel cell stack 1 in which the plurality of the fuel cells 10 are stacked, each single cell of the fuel cells including: the electrolyte membrane 111 that includes the catalyst layers 112A and 113A on both sides of the anode and the cathode; the anode flow channels 121 that supply anode gas as fuel gas toward the anode; and the cathode flow channels 131 that supply cathode gas as oxidation gas toward the cathode. The fuel cell system 100 further includes: the anode gas supply/discharge apparatus 3 as a fuel gas adjusting apparatus that adjusts anode gas of the anode flow channels 121; the cathode gas supply/discharge apparatus 2 as an oxidation gas adjusting apparatus that adjusts cathode gas of the cathode flow channels 131; and the control unit 200 that controls the anode gas supply/discharge apparatus 3 and the cathode gas supply/discharge apparatus 2 in accordance with the state (load request current etc.) of the fuel cell stack 1.

Moreover, the control unit 200 functions as: an operation determining unit that determines whether the operating state is an operation at a low-temperature startup (low-temperature startup operation) or an operation at a normal running (normal-running operation); and a recovery control unit that executes the recovery control for increasing the concentration gradient of water of the electrolyte membrane 111 to be larger than that in the normal-running operation by using a concentration gradient adjusting apparatus when the operation determining unit determines that the operating state is the low-temperature startup operation (when the ON signal of IGN is received) (see: Step S113 of FIG. 5 and FIG. 7).

Therefore, the fuel cell system 100 according to the present embodiment moves moisture in the cathode catalyst layer 113A to the electrolyte membrane 111 at the time of the low-temperature startup of the fuel cell stack 1 by executing the recovery control.

According to this, because the recovery control performed during the low-temperature startup operation increases the concentration gradient of water of the electrolyte membrane 111 to be larger than the concentration gradient of water in the normal-running operation, moisture contained in the cathode catalyst layer 113A can be moved toward the electrolyte membrane 111 and can be removed.

In other words, instead of a method for evaporating moisture in the cathode catalyst layer 113A into the cathode flow channels 131 like the conventional dry air supply process, the present embodiment can remove moisture contained in the cathode catalyst layer 113A by using a method for moving the moisture toward the electrolyte membrane 111 and thus can recover the output performance of the fuel cell stack 1.

Particularly, as already explained in FIG. 8, the temperature range under the low temperature environment belongs to the water movement superiority area in which moisture movement (back-diffusion phenomenon) from the cathode catalyst layer 113A to the electrolyte membrane 111 has superiority as compared to the discharge of moisture in the cathode catalyst layer 113A to the cathode flow channels 131 due to its evaporation. Therefore, the moisture in the cathode catalyst layer 113A can be more effectively removed by performing the recovery control during the low-temperature startup operation executed under the low temperature environment to promote the back-diffusion phenomenon.

In other words, according to the recovery control of the present embodiment, although the ambient temperature such as the stack temperature is not raised up to a high temperature as requested in the conventional dry air process, the moisture in the cathode catalyst layer 113A can be effectively removed. Therefore, the output performance of the fuel cell stack 1 can be recovered to a desired performance while shortening a time for the low-temperature startup operation that includes the subzero startup process and the recovery control.

Furthermore, in the fuel cell system 100 according to the present embodiment, the concentration gradient adjusting apparatus includes the power unit 52 as an output current adjusting device that adjusts a stack current that is the output current of the fuel cell stack 1. Moreover, the control unit 200 functioning as the recovery control unit decreases the stack current to be lower than a required output current (load request current) based on the requested load by using the power unit 52 so as to increase the concentration gradient of water in the electrolyte membrane 111 (see: time t2 to time t3 of FIG. 6(*b*) and FIG. 7).

As a result, because the stack current becomes smaller than the load request current during the stack current reduction process as the recovery control, an anode-gas supply flow rate required to realize the decreased stack current is decreased. Therefore, the actual anode-gas supply flow rate (recovery-control target anode-gas supply flow rate) becomes excessive with respect to the anode-gas supply flow rate required to realize the stack current. As a result, the anode-gas stoichiometric ratio in the recovery control increases as compared to that during the normal-running operation etc.

Therefore, the flow rate of anode gas to be supplied to the anode catalyst layer 112A from the anode flow channels 121 via the gas diffusion layer 112B becomes excessive with respect to a theoretical amount consumed in power generation, and thus an anode-gas flow rate remaining inside the anode catalyst layer 112A is increased. As a result, because the surplus anode gas diffuses into the anode electrolyte, the removal of moisture from inside the anode electrolyte is promoted by the anode gas.

Particularly, because the principal component of anode gas is hydrogen having small molecular weight, the anode gas has a high diffusion effect as compared to cathode gas including nitrogen and oxygen as principal components. Furthermore, because moisture is not substantially contained in the anode holes of the anode catalyst layer 112A, the anode gas diffuses through the anode holes without being blocked. Therefore, the moisture inside the anode electrolyte is more preferably removed by the recovery control.

Consequently, a moisture content in the anode catalyst layer 112A decreases more, and thus the increase in the concentration gradient of water between the anode catalyst layer 112A and the cathode catalyst layer 113A is promoted more (see the solid-line graph of FIG. 7). Therefore, moisture movement (back-diffusion phenomenon) from the cathode catalyst layer 113A to the electrolyte membrane 111 is promoted more.

In other words, the promotion of moisture movement from the cathode catalyst layer 113A to the electrolyte membrane 111 can be realized by employing simple control to decrease a stack current to be lower than a load request current. Therefore, the simple control contributes to the speedier recovery of the output performance of the fuel cell stack 1 at the time of the low-temperature startup operation.

Furthermore, in the present embodiment, because the stack current is made lower than the load request current as described above, the actual power generation amount of the fuel cell stack 1 becomes lower than the power generation amount of the fuel cell stack 1 according to the request of a load. Therefore, water is restrained from being produced by power generation. In other words, because the produced water is restrained from being accumulated into the cathode catalyst layer 113A, the recovery control can more promptly remove moisture from the cathode catalyst layer 113A and thus contributes to further time shortening for the low-temperature startup operation.

As described above, in the control method of the fuel cell system 100 including the fuel cell stack 1 according to the present embodiment, the control unit 200 determines whether the operating state is the low-temperature startup operation or the normal-running operation, and executes the recovery control to increase the concentration gradient of water in the electrolyte membrane 111 of the fuel cell 10 as a fuel battery to be larger than the concentration gradient of water in the normal-running operation when it is determined that the operating state is the low-temperature startup operation (when the ON signal of IGN is received) (Step S113 of FIG. 5).

As described above, instead of the method for evaporating moisture in the cathode catalyst layer 113A into the cathode flow channels 131 like the conventional dry air supply process, moisture contained in the cathode catalyst layer 113A is removed by the method for moving the moisture toward the electrolyte membrane 111 and thus the moisture in the cathode 113 can be more effectively removed without raising the temperature of the fuel cell stack 1 up to a high temperature as required in the conventional dry air process. Therefore, the output performance of the fuel cell stack 1 is recovered to a desired performance and the time shortening for the low-temperature startup operation can be achieved.

In the present embodiment, it has been explained that the recovery control is executed after the subzero startup process (after raising the temperature of the fuel cell stack 1) as an example, but the recovery control may be executed during the subzero startup process (during raising the temperature of the fuel cell stack 1).

Moreover, in the time chart of FIG. 6 according to the present embodiment, it has been explained that the actual anode-gas supply flow rate (recovery-control target anode-gas supply flow rate) is adjusted to the same value as that of the requested anode-gas supply flow rate at the time of the subzero startup process. In other words, in this example, the actual anode-gas supply flow rate (recovery-control target anode-gas supply flow rate) is set to be larger than the requested anode-gas supply flow rate during the recovery control.

However, the actual anode-gas supply flow rate (recovery-control target anode-gas supply flow rate) may be set to the same value as that of the requested anode-gas supply flow rate (see the dashed-two dotted line of FIG. 6(c)) during the recovery control. In other words, during the recovery control according to the present embodiment, the anode-gas supply flow rate may be controlled to be adjusted to the requested anode-gas supply flow rate during the recovery control in accordance with the normal flow control, and only the stack current may be set to be lower than the load request current. Even in this case, because a state in which the anode-gas flow rate inside the anode catalyst layer 112A becomes redundant can be realized, the effect of removing moisture in the anode catalyst layer 112A as explained already can be achieved.

Second Embodiment

Hereinafter, the second embodiment of the present invention will be explained. It should be noted that the same components as those of the first embodiment have the same reference numbers and their descriptions are omitted. Particularly, in the present embodiment, the control unit 200 functioning as the recovery control unit sets a stack current during recovery control to substantially zero.

Figure 10:
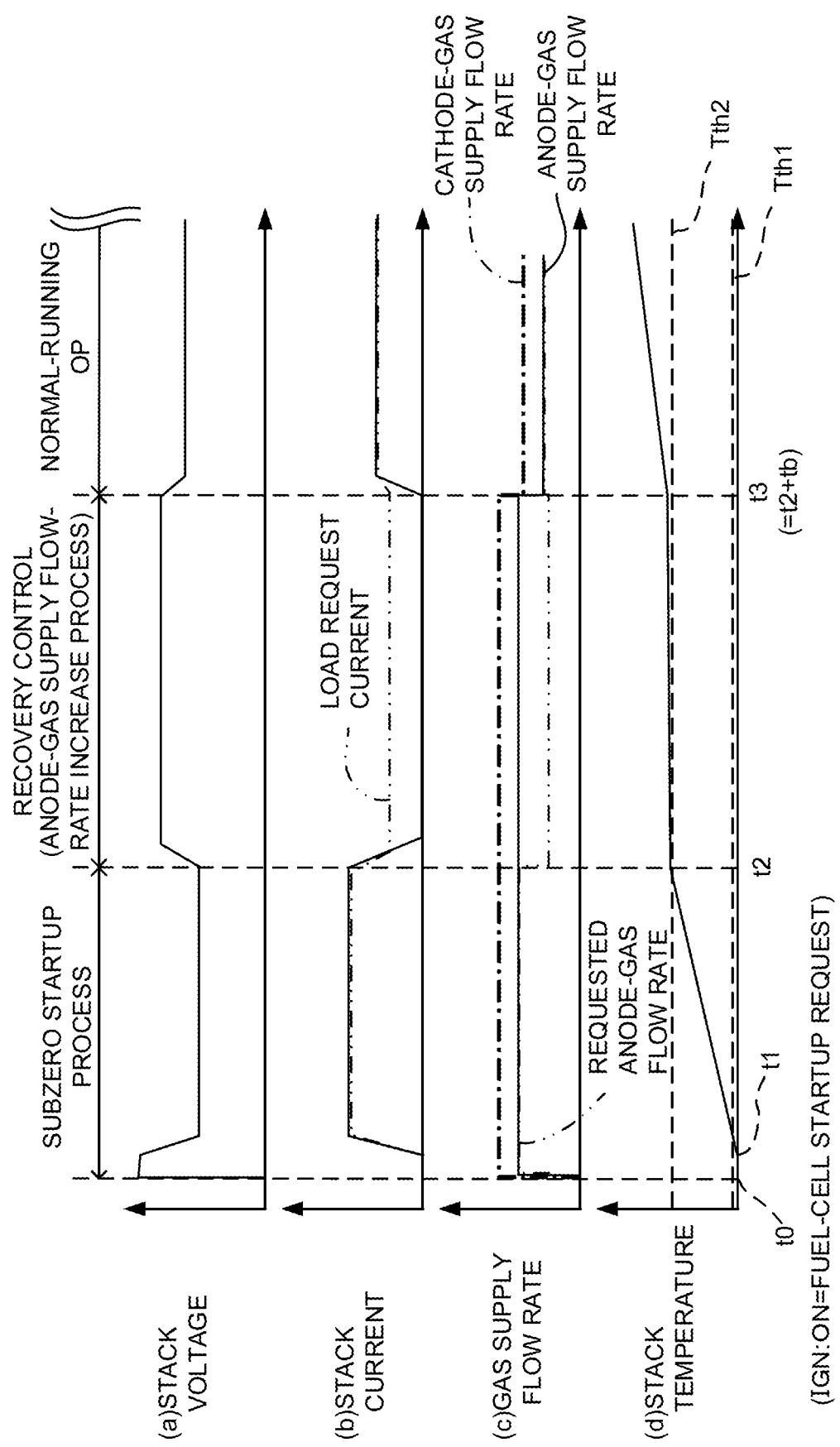
FIG. 10 is a timing chart explaining a temporal change from a low-temperature startup operation to a normal-running operation according to a second embodiment.

FIG. 10 is an example of a timing chart explaining a temporal change from a low-temperature startup operation to a normal-running operation of the fuel cell system 100 according to the present embodiment. Herein, the graph of FIG. 10(a) indicates the change in a stack voltage and the graph of FIG. 10(b) indicates the change in a stack current. Moreover, the graph of FIG. 10(c) indicates the changes in an anode-gas supply flow rate and a cathode-gas supply flow rate. Furthermore, the graph of FIG. 10(d) indicates the change in the stack temperature Ts.

As illustrated in the drawing, in the present embodiment, the control unit 200 sets a recovery-control target output current of the fuel cell stack 1 to substantially zero at a time t2 at which the recovery control is started, and executes a stack current reduction process (see time t2 to time t3 of FIG. 10(b)) for controlling the power unit 52 so that the stack current approaches this recovery-control target output current during the recovery control. In other words, the stack current is set to substantially zero. In this way, a shortfall of the supply of power to a load that can be caused by limiting the extraction of a current from the fuel cell stack 1 is supplemented with electric power of a battery (not illustrated) etc. similarly to the first embodiment.

On the other hand, similarly to the first embodiment, the control unit 200 adjusts the anode-gas supply flow rate (recovery-control target anode-gas supply flow rate) to the same value as that of the requested anode-gas supply flow rate at the time of the subzero startup process. As a result, the actual anode-gas supply flow rate during the stack current reduction process exceeds the requested anode-gas supply flow rate (see the dashed-two dotted line of FIG. 6(c)) during the stack current reduction process. In other words, an anode-gas stoichiometric ratio increases when the transition is performed from the subzero startup process to the stack current reduction process.

The fuel cell system 100 according to the present embodiment described above has the following operational effect.

In the present embodiment, the control unit 200 as the recovery control unit sets the stack current to substantially zero by using the power unit 52 (see time t2 to time t3 of FIG. 10(c)).

As a result, an anode-gas supply flow rate required to realize an actual stack current theoretically becomes substantially zero. Therefore, an anode-gas stoichiometric ratio defined as a ratio of the actual anode-gas supply flow rate (recovery-control target anode-gas supply flow rate) to the anode-gas supply flow rate required to realize the actual stack current (recovery-control target output current) grows larger as compared to the anode-gas stoichiometric ratio in the normal-running operation etc. even how the actual anode-gas supply flow rate is set.

As a result, during the low-temperature startup operation, the increase in the anode-gas stoichiometric ratio that can realize the increase in the concentration gradient of water in the electrolyte membrane 111 explained already can be more easily realized.

Particularly, if the actual stack current during the recovery control is set to substantially zero like the present embodiment, the fuel cell stack 1 is in a state in which its power generation is not substantially executed. Therefore, the generation of produced water inside the cathode catalyst layer 113A during the recovery control can be made substantially zero. In other words, because the generation of new moisture inside the cathode catalyst layer 113A is still more restrained, the effect of the recovery control aimed at the removal of moisture from inside the cathode catalyst layer 113A is still more improved.

As already explained above, the anode-gas stoichiometric ratio is defined as the actual anode-gas supply flow rate with respect to the anode-gas supply flow rate required to realize the actual stack current. Therefore, if the anode-gas supply flow rate required to realize the stack current becomes substantially zero by setting the actual stack current to substantially zero, the anode-gas stoichiometric ratio theoretically has a value that considerably exceeds one regardless of the size of the actual anode-gas supply flow rate.

That is to say, when the actual stack current during the recovery control is decreased up to substantially zero like the present embodiment, the anode-gas stoichiometric ratio can be maintained to a value higher than one even if the actual anode-gas supply flow rate is largely decreased within a range where it does not become zero, for example.

Therefore, instead of a mode (see time t1 to time t3 of FIG. 10(c)) in which the anode-gas supply flow rate is maintained over the subzero startup process and the recovery control, the actual anode-gas supply flow rate may be decreased to be lower than the requested anode-gas supply flow rate during the recovery control within a range where the actual anode-gas supply flow rate does not become substantially zero, for example. Moreover, similarly to a control logic of a normal anode-gas supply flow rate even in the recovery control, control may be performed to decrease the actual anode-gas supply flow rate by decreasing the load request itself to decrease the requested anode-gas supply flow rate itself during the recovery control while setting the recovery-control target anode-gas supply flow rate to the same value as that of the requested anode-gas supply flow rate.

As a result, while securing a promotion effect of moisture movement from the cathode catalyst layer 113A to the electrolyte membrane 111 at the time of the low-temperature startup operation, the consumption amount of anode gas during the recovery control can be reduced.

Third Embodiment

Hereinafter, the third embodiment of the present invention will be explained. It should be noted that the same components as those of the first embodiment have the same reference numbers and their descriptions are omitted. In the present embodiment, the control unit 200 functioning as a recovery control unit controls the anode gas supply/discharge apparatus 3 to increase an anode-gas supply flow rate during recovery control to be larger than a requested anode-gas supply flow rate and thus to increase the concentration gradient of water in the electrolyte membrane 111.

Figure 11:
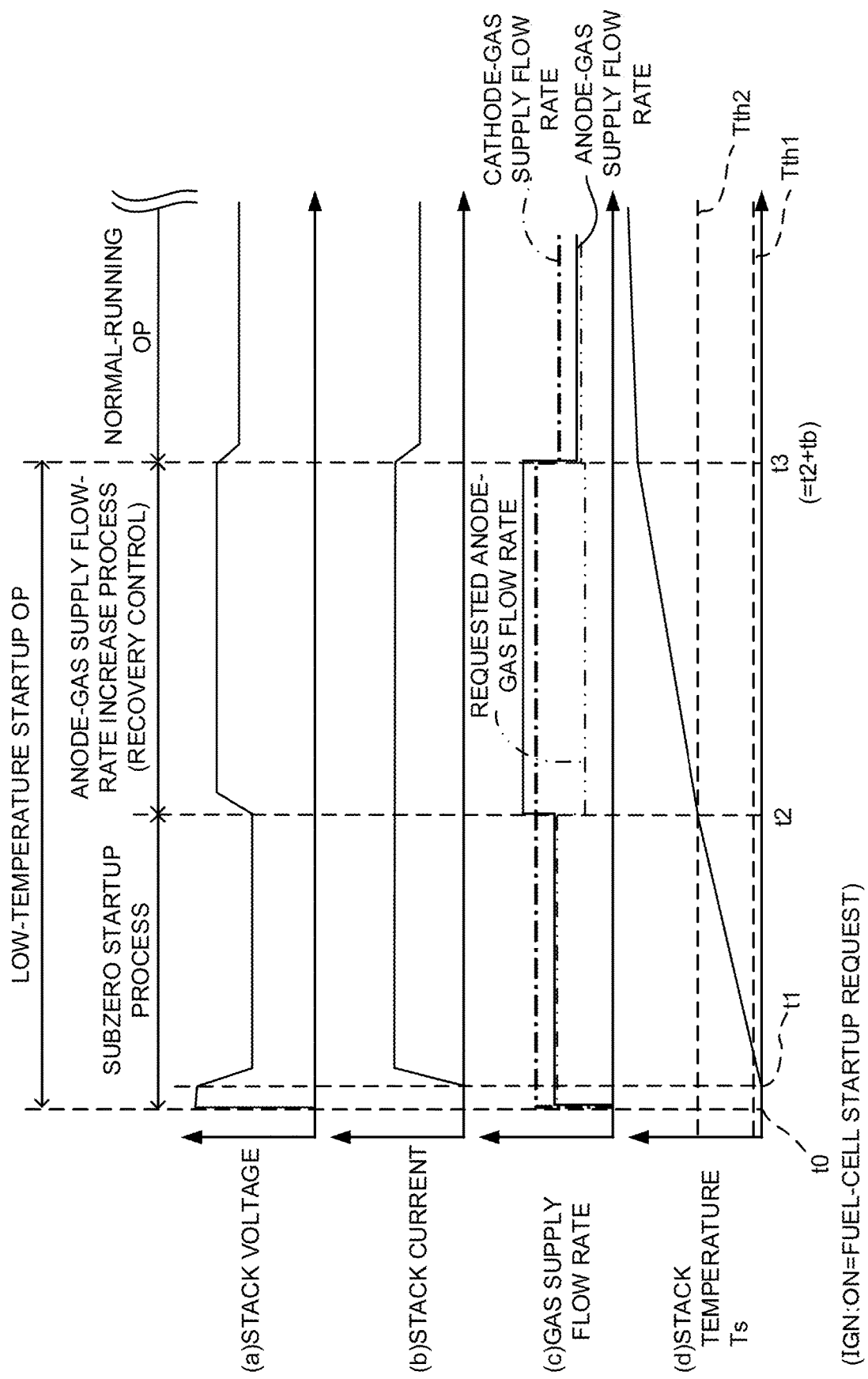
FIG. 11 is a timing chart explaining a temporal change in a low-temperature startup operation according to a third embodiment.

FIG. 11 is an example of a timing chart explaining a temporal change from a low-temperature startup operation to a normal-running operation of the fuel cell system 100 according to the present embodiment. Herein, the graph of FIG. 11(a) indicates the change in a stack voltage and the graph of FIG. 11(b) indicates the change in a stack current. Moreover, the graph of FIG. 11(c) indicates the changes in an anode-gas supply flow rate and a cathode-gas supply flow rate. Furthermore, the graph of FIG. 11(d) indicates the change in the stack temperature Ts.

Particularly, in the present embodiment, as the recovery control, instead of the stack current reduction process for decreasing a stack current, the control unit 200 executes an anode-gas supply flow-rate increase process for increasing an anode-gas supply flow rate to be larger than a requested anode-gas supply flow rate (see the broken line of FIG. 11(c)) (see time t2 to time t3 of FIG. 11(c)).

Specifically, as the anode-gas supply flow-rate increase process upon transferring to the recovery control from the subzero startup process, the control unit 200 sets a recovery-control target anode-gas supply flow rate having a value higher than the requested anode-gas supply flow rate and controls the anode gas supply/discharge apparatus 3 so that the anode-gas supply flow rate approaches the recovery-control target anode-gas supply flow rate.

On the other hand, in the present embodiment, the control unit 200 maintains a load request current according to a load even if the transition is performed from the subzero startup process to the recovery control and maintains the stack current (see time t2 to time t3). In other words, the control unit 200 uniforms the requested loads during the subzero startup process and the recovery control and sets a recovery-control target output current to the same value as that of the load request current based on this requested load.

As a result, the anode-gas supply flow rate increases while the stack current is maintained in the course of transferring from the subzero startup process to the recovery control. Therefore, an anode-gas stoichiometric ratio rises. As a result, without using electric power of a battery etc., the anode-gas stoichiometric ratio can be increased while maintaining a state in which the required power of the load is satisfied by the power generation of the fuel cell stack 1.

In addition, in the present embodiment, in transferring the fuel cell stack 1 to the normal-running operation at the time t3 at which the recovery control is terminated, the anode-gas supply flow rate is decreased more than that of the case of the first embodiment in order to match the stack current with a relatively-low initial load request current of the normal-running operation.

The fuel cell system 100 according to the present embodiment described above has the following operational effect.

In the fuel cell system 100 according to the present embodiment, the concentration gradient adjusting apparatus includes the anode gas supply/discharge apparatus 3 as a fuel gas adjusting apparatus. The control unit 200 as a recovery control unit increases the anode-gas supply flow rate to be larger than the requested anode-gas supply flow rate based on the requested load by using the anode gas supply/discharge apparatus 3 so as to increase the concentration gradient of water in the electrolyte membrane 111 (see: time t2 to time t3 of FIG. 11(c) and FIG. 7).

As a result, without reducing the stack current during the recovery control, the present embodiment can realize the increased state of the anode-gas stoichiometric ratio in which the increase of the concentration gradient of water in the electrolyte membrane 111 can be realized. In other words, because a state in which the required power of the load is satisfied by the generated power of the fuel cell stack 1 is maintained, moisture movement from the cathode catalyst layer 113A to the electrolyte membrane 111 can be promoted without supplementing electric power from a battery etc., similarly to the case where the stack current reduction process according to the first embodiment is performed.

In addition, in the present embodiment, without changing the stack current in the course (see time t2 of FIG. 11) of transferring from the subzero startup process to the recovery control, the anode-gas stoichiometric ratio is increased by increasing the anode-gas supply flow rate.

However, the present invention is not limited to this. For example, like the first embodiment, the load request current in the recovery control is made lower than the load request current in the subzero startup process and then the recovery-control target output current may be set to the same value as that of the load request current during the recovery control. In other words, the stack current may be decreased in accordance with the decrease of the load request current when transferring from the subzero startup process to the recovery control.

In this case, although the stack current decreases in accordance with the decrease of the load request current in the course of transferring from the subzero startup process to the recovery control, the increase of the anode-gas stoichiometric ratio is realized because the actual anode-gas supply flow rate (recovery-control target anode-gas supply flow rate) during the recovery control grows higher than the requested anode-gas supply flow rate during the recovery control.

Moreover, while maintaining the anode-gas supply flow rate to be higher than the requested anode-gas supply flow rate during the recovery control, the stack current may be made lower than the load request current. In other words, the stack current reduction process of the first embodiment and the anode-gas supply flow-rate increase process of the present embodiment may be combined with each other as the recovery control. As a result, the anode-gas stoichiometric ratio can be more effectively increased during the recovery control and thus a moisture movement effect from the cathode catalyst layer 113A to the electrolyte membrane 111 can be further enhanced.

Fourth Embodiment

Hereinafter, the fourth embodiment of the present invention will be explained. It should be noted that the same components as those of the first embodiment have the same reference numbers and their descriptions are omitted. Particularly, the control unit 200 according to the present embodiment functions as a recovery control termination determining unit that determines a termination time of recovery control (stack current reduction process) explained in Step S113 and terminates the recovery control when reaching this termination time.

Specifically, in the present embodiment, a cathode gas increase-decrease process for decreasing and then increasing a cathode-gas supply flow rate during the recovery control is executed more than once, and the determination of the termination time of the recovery control is performed based on the behavior of a cell voltage during the cathode gas increase-decrease process.

Moreover, in the present embodiment, during the recovery control, a recovery-control target cathode-gas supply flow rate is set as the target value of a cathode-gas supply flow rate, instead of a requested cathode-gas supply flow rate based on a load request current. During the recovery control, the control unit 200 controls the output etc. of the compressor 22 of the cathode gas supply/discharge apparatus 2 so that the detected value of the cathode-gas supply flow rate obtained by the air flow meter 23 approaches the recovery-control target cathode-gas supply flow rate.

Figure 12:
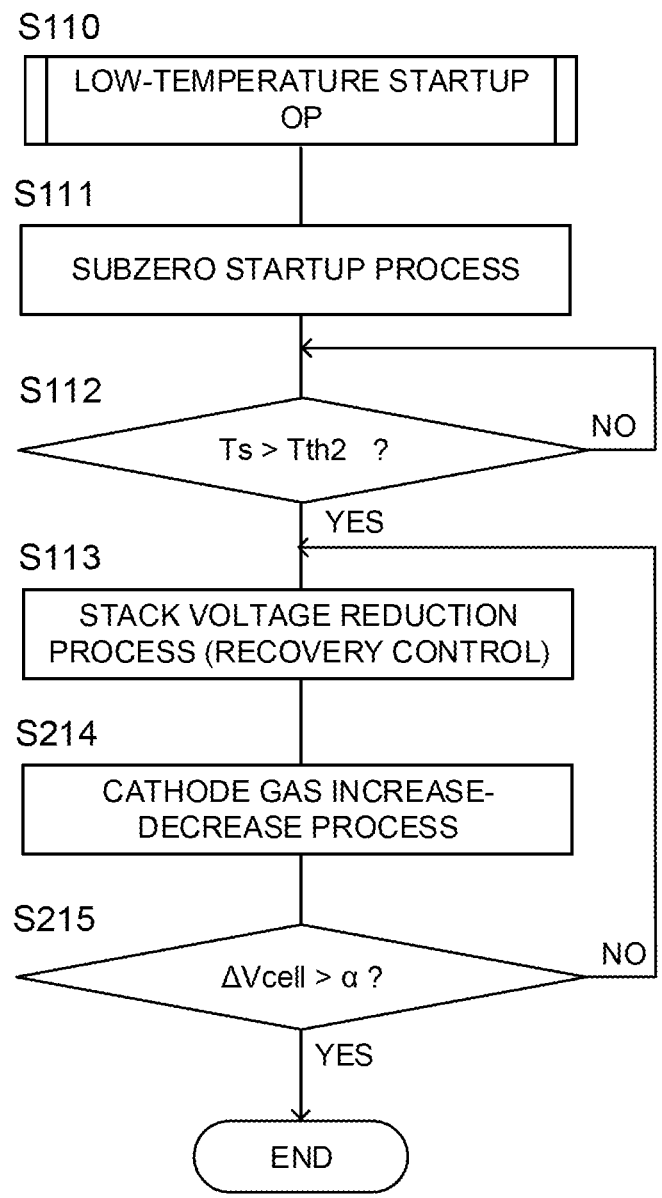
FIG. 12 is a flowchart explaining the flow of a low-temperature startup operation according to a fourth embodiment.

FIG. 12 is a flowchart explaining the flow of a low-temperature startup operation according to the present embodiment. As illustrated in the drawing, in the present embodiment, the control unit 200 executes the process of Steps S111 to S113 similarly to the first embodiment.

On the other hand, instead of the determination in Step S114 (see FIG. 5) of whether the duration time tre of the stack current reduction process of the first embodiment is larger than the predetermined time tb, the control unit 200 executes the cathode gas increase-decrease process in Step S214 and the termination time determination of the recovery control in Step S215.

For example, in the cathode gas increase-decrease process of Step S214, the control unit 200 increases and decrease the output of the compressor 22 so that the recovery-control target cathode-gas supply flow rate switches between zero and a cathode-gas supply flow rate (hereinafter, also described as "anode-gas-consumption theoretical cathode-gas supply flow rate") tailored to the recovery-control target anode-gas supply flow rate. As a result, the cathode-gas supply flow rate is increased and decreased in the cathode gas increase-decrease process during the recovery control.

Particularly, in the present embodiment, when the recovery-control target cathode-gas supply flow rate is set to zero, namely, when the cathode-gas supply flow rate is controlled to be decreased in the cathode gas increase-decrease process, the control unit 200 decreases the output of the compressor 22 so that the cathode-gas stoichiometric ratio becomes not more than one.

Herein, the cathode-gas stoichiometric ratio in the present embodiment is defined as a ratio of the actual cathode-gas supply flow rate (corresponding to zero or anode-gas-consumption theoretical cathode-gas supply flow rate) to the requested cathode-gas supply flow rate based on the load request current.

Therefore, when the recovery-control target cathode-gas supply flow rate is set to the anode-gas-consumption theoretical cathode-gas supply flow rate, the cathode-gas stoichiometric ratio exceeds one. On the other hand, when the recovery-control target cathode-gas supply flow rate is set to zero, the cathode-gas stoichiometric ratio becomes not more than one. In other words, in the cathode gas increase-decrease process, the control unit 200 increases and decrease the cathode-gas supply flow rate so that the cathode-gas stoichiometric ratio steps over one.

Then, in Step S215, as the determination of the termination time of the recovery control, the control unit 200 performs the determination of whether the present state is a state in which the output of the compressor 22 is increasing by the switch of the recovery-control target cathode-gas supply flow rate from zero to the anode-gas-consumption theoretical cathode-gas supply flow rate, namely, whether a change amount ΔVcell of a cell voltage within a predetermined time Δt during the increase operation of the cathode-gas supply flow rate becomes larger than a threshold α.

Specifically, at the time of the increase of the cathode-gas supply flow rate during the cathode gas increase-decrease process, the control unit 200 continuously acquires a plurality of detected values of the cell voltage by using the current/voltage measuring unit 50 and stores the detected values in a memory etc. Furthermore, the control unit 200 extracts from the memory the plurality of detected values of the cell voltage at the time of the increase of the cathode-gas supply flow rate during the cathode gas increase-decrease process, and computes the change amount ΔVcell within the time Δt for the detected values of the cell voltage.

Then, when it is determined that the change amount ΔVcell of the cell voltage is larger than the predetermined threshold α, the control unit 200 determines that the output performance of the fuel cell stack 1 is recovered up to a desired area and terminates the stack voltage reduction process acting as the recovery control (namely, transfers to the normal running).

On the other hand, when it is determined that the change amount ΔVcell of the cell voltage is not larger than the predetermined threshold α, the control unit 200 determines that the output performance of the fuel cell stack 1 does not reach the desired level, and continues to repeat the stack voltage reduction process of Step S113, the cathode gas increase-decrease process of Step S214, and the determination of Step S215.

Figure 13:
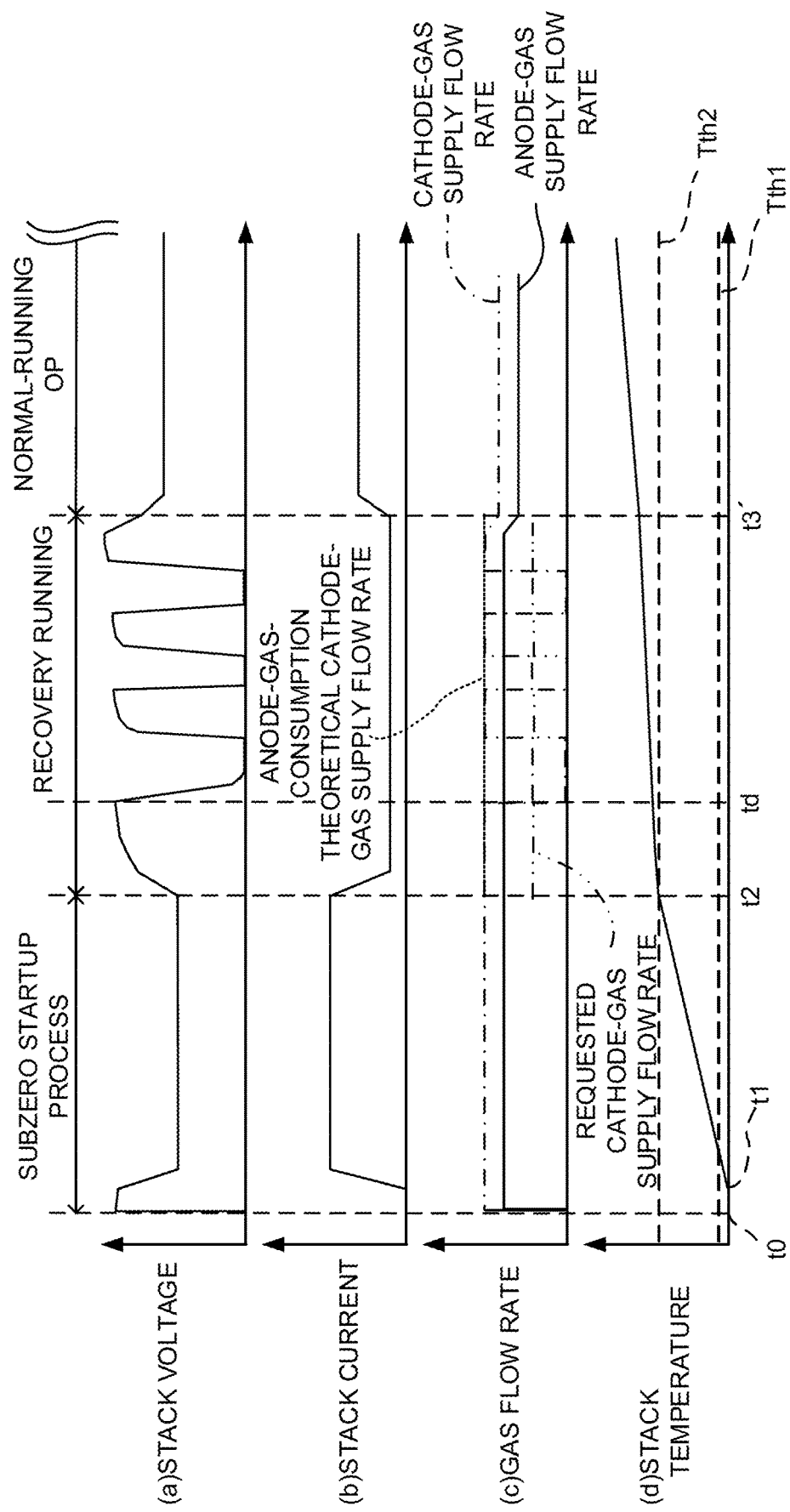
FIG. 13 is a timing chart explaining a temporal change in the low-temperature startup operation according to the fourth embodiment.

FIG. 13 is an example of a timing chart explaining a temporal change from the low-temperature startup operation to the normal-running operation of the fuel cell system 100 according to the present embodiment. Herein, the graph of FIG. 13(*a*) indicates the change in a stack voltage and the graph of FIG. 13(*b*) indicates the change in a stack current. Moreover, the graph of FIG. 13(*c*) indicates the changes in an anode-gas supply flow rate and a cathode-gas supply flow rate. Furthermore, the graph of FIG. 13(*d*) indicates the change in the stack temperature Ts.

As illustrated in the drawing, in the present embodiment, the cathode gas increase-decrease process is started at a time td at which a predetermined time has elapsed from a time t2 at which the recovery control is started (see FIG. 13(*c*). In the drawing, the cathode gas increase-decrease process, of which one cycle is an operation to decrease and then increase the cathode-gas supply flow rate, is executed three times.

In the cathode gas increase-decrease process, because the control unit 200 increases and decrease the cathode-gas supply flow rate so that the cathode-gas stoichiometric ratio steps over one as described above, two states are repeated in which the cathode-gas supply flow rate to the fuel cell stack 1 is insufficient and sufficient for the request of power generation. As a result, the stack voltage also increases and decreases (see FIG. 13(*a*)).

Particularly, the present embodiment determines the appropriate termination time of the recovery control based on an increased amount of the change amount ΔVcell of the cell voltage at the timing at which the cathode-gas supply flow rate is increased in the cathode gas increase-decrease process.

Then, at a time t3', when it is determined that the change amount ΔVcell of the cell voltage at the time of the increase of the cathode-gas supply flow rate during the cathode gas increase-decrease process is larger than the predetermined threshold α, the control unit 200 transfers the fuel cell stack 1 to the normal-running operation.

Hereinafter, based on the size comparison between the threshold α and the change amount ΔVcell of the cell voltage at the time of the increase of the cathode-gas supply flow rate, the validity of performing the determination of performance recovery of the fuel cell stack 1 will be explained.

Figure 14:
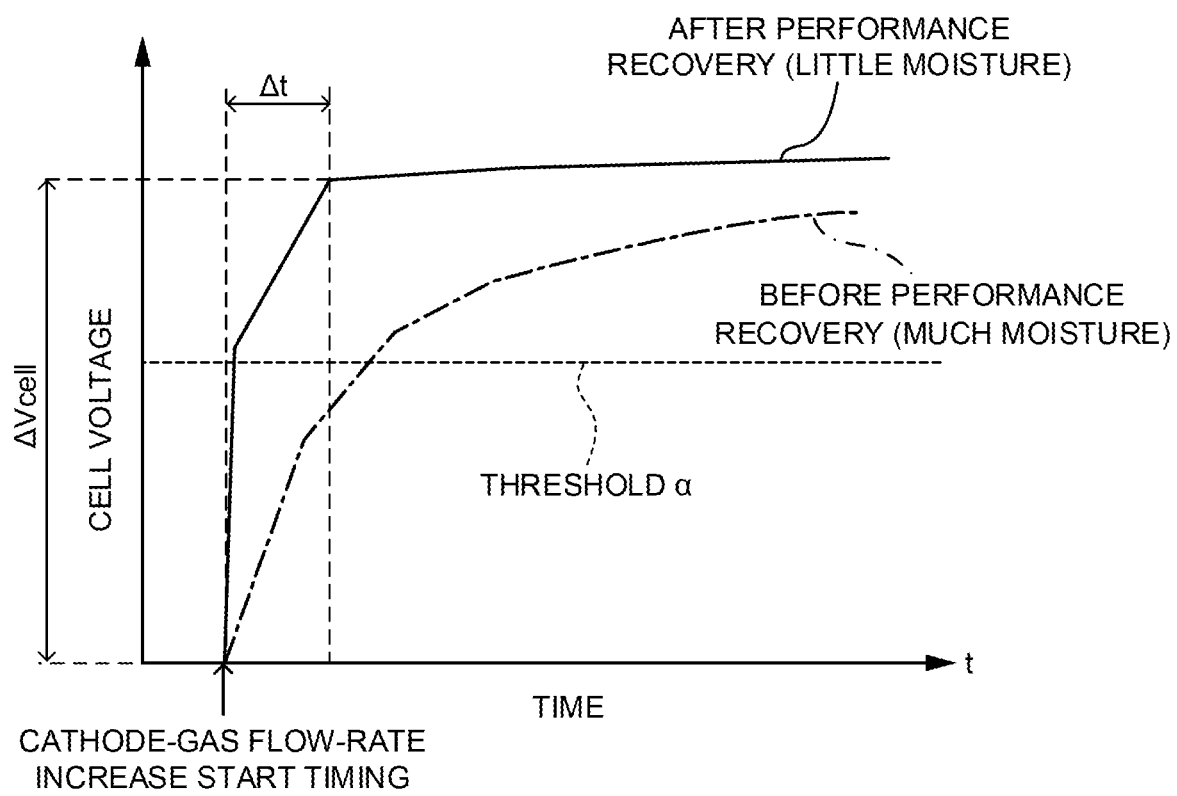
FIG. 14 is a graph illustrating a difference of a time change in a cell voltage between before and after the recovery of output performance.

FIG. 14 is a graph illustrating a difference of a time change in a cell voltage between before and after the recovery of output performance of the fuel cell stack 1 according to the present embodiment. More specifically, FIG. 14 illustrates time changes in respective cell voltages at the time of the increase of the cathode-gas supply flow rate when the cathode gas increase-decrease process is executed on the fuel cell stack 1 on which the recovery control is not performed and the fuel cell stack 1 on which the recovery control is already executed.

Herein, the dashed-dotted-line graph of FIG. 14 illustrates a time change in a cell voltage when the recovery control is not performed on the fuel cell stack 1, moisture is contained in the cathode catalyst layer 113A, and the output performance is relatively low. Moreover, the solid-line graph of FIG. 14 illustrates a time change in a cell voltage after the recovery control of the present embodiment is executed.

As can be seen from FIG. 14, the change amount ΔVcell of the cell voltage within the predetermined time Δt exceeds the threshold α when the recovery control is executed, but the change amount falls below the threshold α when the recovery control is not performed. In other words, an increasing rate (rising rate) of the cell voltage within the predetermined time Δt after starting the increase of the cathode-gas supply flow rate becomes higher when the recovery control is executed.

Therefore, like the present embodiment, the termination time of the recovery control is determined when the change amount ΔVcell of the cell voltage within the predetermined time Δt at the time of the increase of the cathode-gas supply flow rate is larger than the threshold α. Hence, a timing at which the output performance of the fuel cell stack 1 is recovered can be adapted to the actual termination timing of the recovery control.

The fuel cell system 100 according to the present embodiment described above has the following operational effect.

In the fuel cell system 100 according to the present embodiment, the control unit 200 as the recovery control unit functions as the recovery control termination determining unit that determines the termination time of the recovery control (Step S215 of FIG. 12) and terminates the recovery control when determining the termination time of the recovery control (Yes of Step S215 of FIG. 12).

As a result, the recovery control can be terminated at the timing at which the output performance of the fuel cell stack 1 is recovered up to the desired area, and thus the recovery control can be restrained from being continued even though the output performance of the fuel cell stack 1 is recovered. Consequently, this contributes to the time shortening for the low-temperature startup operation.

Moreover, the fuel cell system 100 according to the present embodiment further includes the current/voltage measuring unit 50 that is an output voltage detecting unit that detects a cell voltage as the output voltage of the fuel battery. The control unit 200 acting as the recovery control termination determining unit controls the cathode gas supply/discharge apparatus 2 during the recovery control to execute at least once the cathode gas increase-decrease process (Step S214 of FIG. 12) as an oxidation gas increase-decrease process for decreasing and then increasing the cathode-gas supply flow rate to the fuel cell stack 1, and determines the termination time of the recovery control based on the behavior of the cell voltage during the cathode gas increase-decrease process (Step S215 of FIG. 12).

As already explained above, when the output performance of the fuel cell stack 1 is recovered by progressing the recovery control, the behavior of the cell voltage during the cathode gas increase-decrease process differs from before the recovery in which the output performance is relatively low due to the remaining moisture (see FIG. 14).

Therefore, by determining the termination time of the recovery control based on the behavior of the cell voltage during the cathode gas increase-decrease process, a timing at which the output performance of the fuel cell stack 1 is recovered can be more surely adapted to the actual termination time of the recovery control. Consequently, while more surely recovering the output performance of the fuel cell stack 1, the wasteful continuation of the recovery control is more surely prevented to contribute to the time shortening for the low-temperature startup operation.

Furthermore, in the fuel cell system 100 according to the present embodiment, the control unit 200 acting as the recovery control termination determining unit controls the cathode gas supply/discharge apparatus 2 in such a manner that a cathode-gas stoichiometric ratio that is a ratio of the cathode-gas supply flow rate to a requested oxidation-gas supply flow rate (requested cathode-gas supply flow rate) based on the requested load becomes not more than one at the time of the decrease operation of the cathode-gas supply flow rate during the cathode gas increase-decrease process.

As a result, an operation for decreasing the cathode-gas supply flow rate during the cathode gas increase-decrease process can more surely decrease a cell voltage by generating a state where the cathode-gas supply flow rate is insufficient for the request of power generation. Therefore, when the operation for increasing the cathode-gas supply flow rate is executed after the decrease operation of the cathode-gas supply flow rate, the change in the cell voltage can be more surely detected and thus the determination accuracy for the termination time of the recovery control is further improved.

Moreover, in the fuel cell system 100 according to the present embodiment, the control unit 200 acting as the recovery control termination determining unit determines the termination time of the recovery control when the cell voltage arrives at the predetermined threshold $\alpha$ within the predetermined time $\Delta t$ at the time of the increase operation of the cathode-gas supply flow rate during the cathode gas increase-decrease process (Step S215 of FIG. 12 and FIG. 14).

As a result, the determination of the termination time of the recovery control can be executed by the easy method of determining whether the cell voltage arrives at the threshold $\alpha$ within the predetermined time.

In addition, although the above threshold $\alpha$ can be previously appropriately set depending on the situation, it is preferable that the lower limit of the change amount $\Delta Vcell$ of the cell voltage defined from a viewpoint of whether the output performance of the fuel cell stack 1 is recovered up to the desired area is set as the threshold $\alpha$.

In addition, the time chart of FIG. 13 illustrates an example in which the cathode gas increase-decrease process is performed three times, but the number of times by which this process is performed may be several times if it is not less than once. However, from the viewpoint of more promptly determining the termination time of the recovery control, it is preferable that the process is executed more than once at time intervals at which the response of an actuator such as the compressor 20 is possible. Moreover, instead of the change amount $\Delta Vcell$ of the cell voltage, the termination time of the recovery control may be determined by the size determination between the predetermined threshold and the change amount of the stack voltage within the predetermined time $\Delta t$.

Furthermore, in determining the termination time of the recovery control, the present embodiment increases and decrease a cathode stoichiometric ratio around one during the cathode gas increase-decrease process and computes the change amount $\Delta Vcell$ of the cell voltage accompanied with this, but the present embodiment is not limited to this. For example, by increasing and decreasing the stack current with a predetermined period without changing the cathode supply flow rate itself, the present embodiment may compute the change amount $\Delta Vcell$ of the cell voltage accompanied with this.

Moreover, with respect to the determination of the termination time of the recovery control, the other determination method may be employed instead of the method in which the termination time of the recovery control is determined when the change amount $\Delta Vcell$ of the cell voltage is larger than the threshold $\alpha$. For example, after a relationship between the degree of the recovery of output performance of the fuel cell stack 1 and the rise of the stack temperature Ts is previously recorded as a table, the termination time of the recovery control may be determined from the stack temperature Ts on the basis of this table.

Fifth Embodiment

Hereinafter, the fifth embodiment of the present invention will be explained. It should be noted that the same components as those of the fourth embodiment have the same reference numbers and their descriptions are omitted. In the present embodiment, as the behavior of a cell voltage during the cathode increase-decrease process, the determination of the termination time of recovery control is executed based on a cell-voltage differential value DVcell that is the time differential value of a cell voltage, instead of the change amount $\Delta Vcell$ of the cell voltage according to the fourth embodiment.

Figure 15:
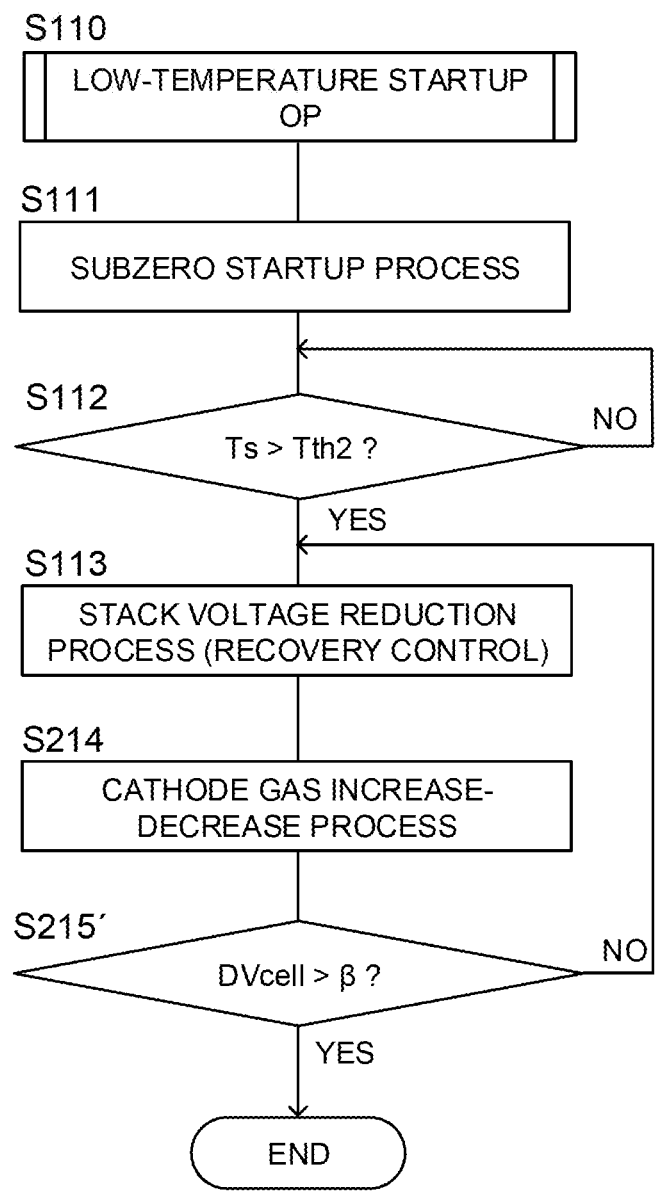
FIG. 15 is a flowchart explaining the flow of a low-temperature startup operation according to a fifth embodiment.

FIG. 15 is a flowchart explaining the flow of a low-temperature startup operation according to the present embodiment. As illustrated in the drawing, the control unit 200 executes the process of Steps S111 to S113 similarly to the first embodiment and executes the cathode gas increase-decrease process of Step S214 similarly to the fourth embodiment.

Then, the control unit 200 in the present embodiment performs the size determination between the cell-voltage differential value DVcell and a predetermined threshold $\beta$ in Step S215'.

Specifically, the control unit 200 acquires the detected values of a plurality of cell voltages detected in accordance with the measurement period of the current/voltage measuring unit 50 during the recovery control, and stores the detected values in a memory etc. Then, at the time of the increase operation of the cathode-gas supply flow rate during the cathode gas increase-decrease process, the control unit 200 divides a difference between the detected values of the two cell voltages in the adjacent measurement periods by this measurement time t0 compute the cell-voltage differential value DVcell.

Then, the control unit 200 determines the size between the cell-voltage differential value DVcell and the predetermined threshold $\beta$. When it is determined that the cell-voltage differential value DVcell is larger than the predetermined threshold $\beta$, the control unit 200 determines that the output performance of the fuel cell stack 1 is recovered up to a desired area and terminates the stack voltage reduction process acting as the recovery control (namely, transfers to the normal-running operation).

On the other hand, when it is determined that the cell-voltage differential value DVcell is not larger than the threshold $\beta$, the control unit 200 determines that the output performance of the fuel cell stack 1 does not reach the desired area and continues to repeat the stack voltage reduction process of Step S113, the cathode gas increase-decrease process of Step S214, and the determination of Step S215'.

Figure 16:
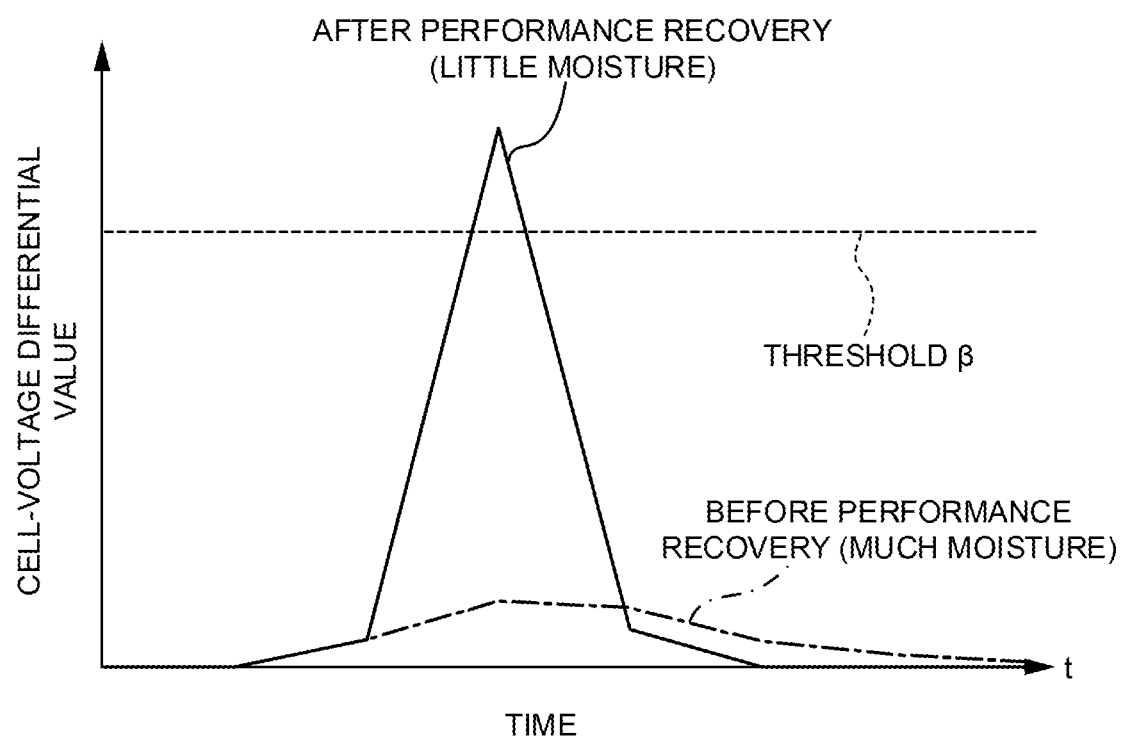
FIG. 16 is a graph illustrating a time change in a cell voltage differential value before and after the recovery of output performance.

FIG. 16 is a graph illustrating a time change in the cell-voltage differential value DVcell between before and after the recovery of output performance of the fuel cell stack 1 according to the present embodiment. More specifically, FIG. 16 illustrates time changes in the respective cell-voltage differential values DVcell at the time of the increase of the cathode-gas supply flow rate when the cathode gas increase-decrease process is executed on the fuel cell stack 1 on which the recovery control is not performed and the fuel cell stack 1 on which the recovery control is already executed.

Herein, the dashed-dotted-line graph of FIG. 16 indicates a time change in the cell-voltage differential value DVcell before performing the recovery control on the fuel cell stack 1. Moreover, the solid-line graph of FIG. 16 indicates a time change in the cell-voltage differential value DVcell after performing the recovery control according to the present embodiment.

As can be seen from FIG. 16, when the recovery control is executed, the cell-voltage differential value DVcell at the time of the increase of the cathode-gas supply flow rate clearly becomes a higher value than that of the case where the recovery control is not performed.

Particularly, the cell-voltage differential value DVcell falls much below the threshold (3 when the recovery control is not performed, but exceeds the threshold β after the recovery control is executed. Therefore, it may be said that information on whether the output performance of the fuel cell stack 1 is recovered is more clearly reflected in the cell-voltage differential value DVcell.

Therefore, like the present embodiment, by determining the termination time of the recovery control when the cell-voltage differential value DVcell is larger than the threshold β at the time of the increase of the cathode-gas supply flow rate, a timing at which the output performance of the fuel cell stack 1 is recovered can be more surely adapted to the actual termination timing of the recovery control.

The fuel cell system 100 according to the present embodiment described above has the following operational effect.

In the fuel cell system 100 according to the present embodiment, the control unit 200 acting as the recovery control termination determining unit computes the cell-voltage differential value DVcell that is the time differential value of the cell voltage at the time of the increase operation of the cathode-gas supply flow rate as the behavior of the cell voltage during the cathode gas increase-decrease process, and determines the termination time of the recovery control when the cell-voltage differential value DVcell is larger than the threshold β as a predetermined value (Yes of Step S215' of FIG. 15).

As a result, because the termination time of the recovery control is determined based on the cell-voltage differential value DVcell to definitely show information on the recovery degree of output performance of the fuel cell stack 1, a timing at which the output performance of the fuel cell stack 1 is recovered can be still more surely adapted to the actual termination time of the recovery control. Moreover, the computation of the cell-voltage differential value DVcell is also simple and easy, and thus the processing burden of the control unit 200 is also reduced.

Sixth Embodiment

Hereinafter, the sixth embodiment of the present invention will be explained. It should be noted that the same components as those of the first to fifth embodiments have the same reference numbers and their descriptions are omitted. Particularly, in a low-temperature startup operation, the present embodiment estimates a stack water content Wst that is a water content in the fuel cell stack 1 based on a stack internal resistance Rst that is the internal resistance of the fuel cell stack 1, and determines whether to execute recovery control based on the estimated stack water content Wst.

In the present embodiment, the stack water content Wst means a total moisture content contained in components, which constitutes the fuel cell stack 1, such as the anode 112, the cathode 113, and the electrolyte membrane 111.

Figure 17:
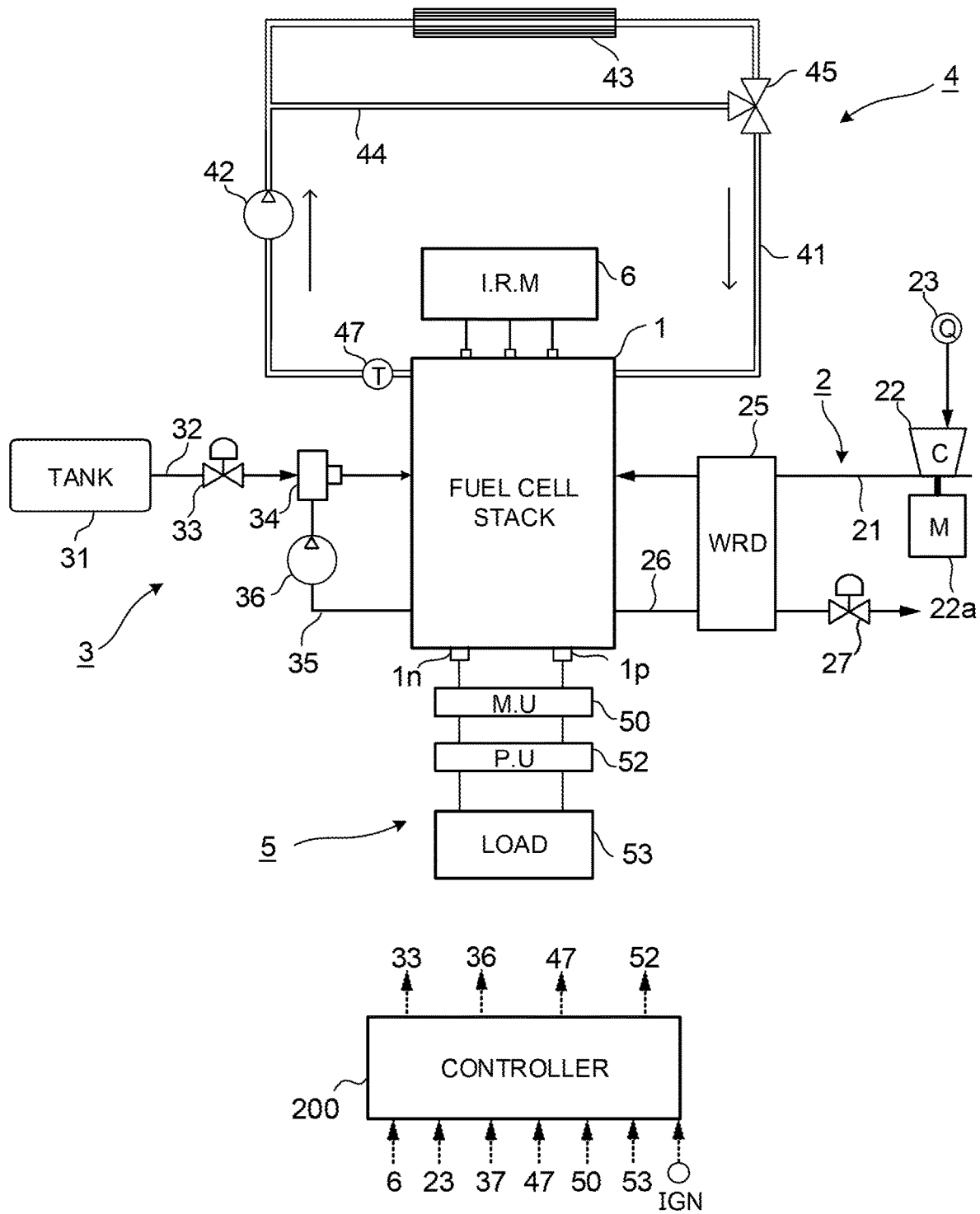
FIG. 17 is a diagram illustrating the configuration of a fuel cell system according to a sixth embodiment.

FIG. 17 is a drawing illustrating the configuration of the fuel cell system 100 according to the sixth embodiment. As illustrated in the drawing, the fuel cell system 100 according to the present embodiment includes an internal resistance measuring device 6 that measures the internal resistance of the fuel cell stack 1.

The internal resistance measuring device 6 is connected to the fuel cell stack 1. The internal resistance measuring device 6 measures the internal impedance of the fuel cell stack 1 based on an appropriate measurement frequency to detect this impedance as the stack internal resistance Rst. The internal resistance measuring device 6 transmits the detected stack internal resistance Rst to the control unit 200.

Figure 18:
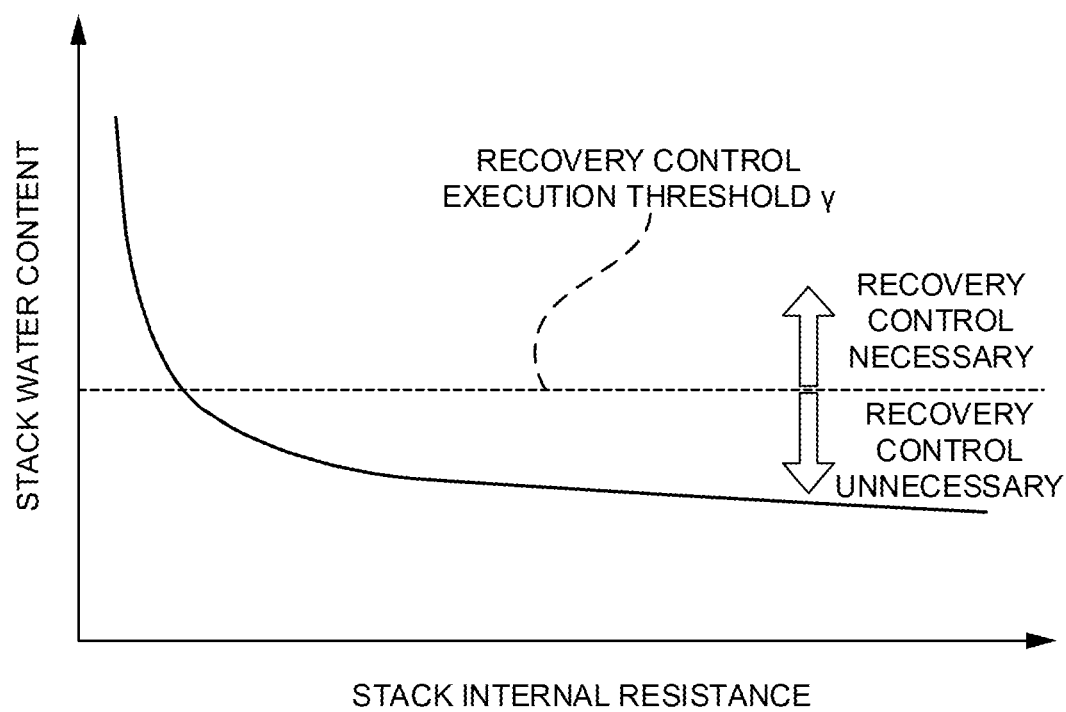
FIG. 18 is a graph illustrating a relationship between a stack internal resistance and a stack water content.

FIG. 18 illustrates a graph illustrating a relationship between the stack internal resistance Rst and the stack water content Wst. As can be seen from the drawing, a relationship between the stack internal resistance Rst and the stack water content Wst typically has the features that the stack water content Wst is lower as the stack internal resistance Rst is higher.

The control unit 200 according to the present embodiment previously stores in a memory etc. the relationship between the stack internal resistance Rst and the stack water content Wst represented by the graph. Then, based on this relationship, the control unit 200 estimates the stack water content Wst from the stack internal resistance Rst received from the internal resistance measuring device 6.

Particularly, as described later, the control unit 200 previously sets, as a recovery control execution threshold γ, the allowable lower limit of the stack water content Wst that does not have a substantial influence on the output performance of the fuel cell stack 1. Then, the control unit 200 determines whether to execute the recovery control on the basis of a magnitude relation between the recovery control execution threshold α and the stack water content Wst computed from the stack internal resistance Rst.

The determination of whether the recovery control of the present embodiment is executed will be explained in more detail.

Figure 19:
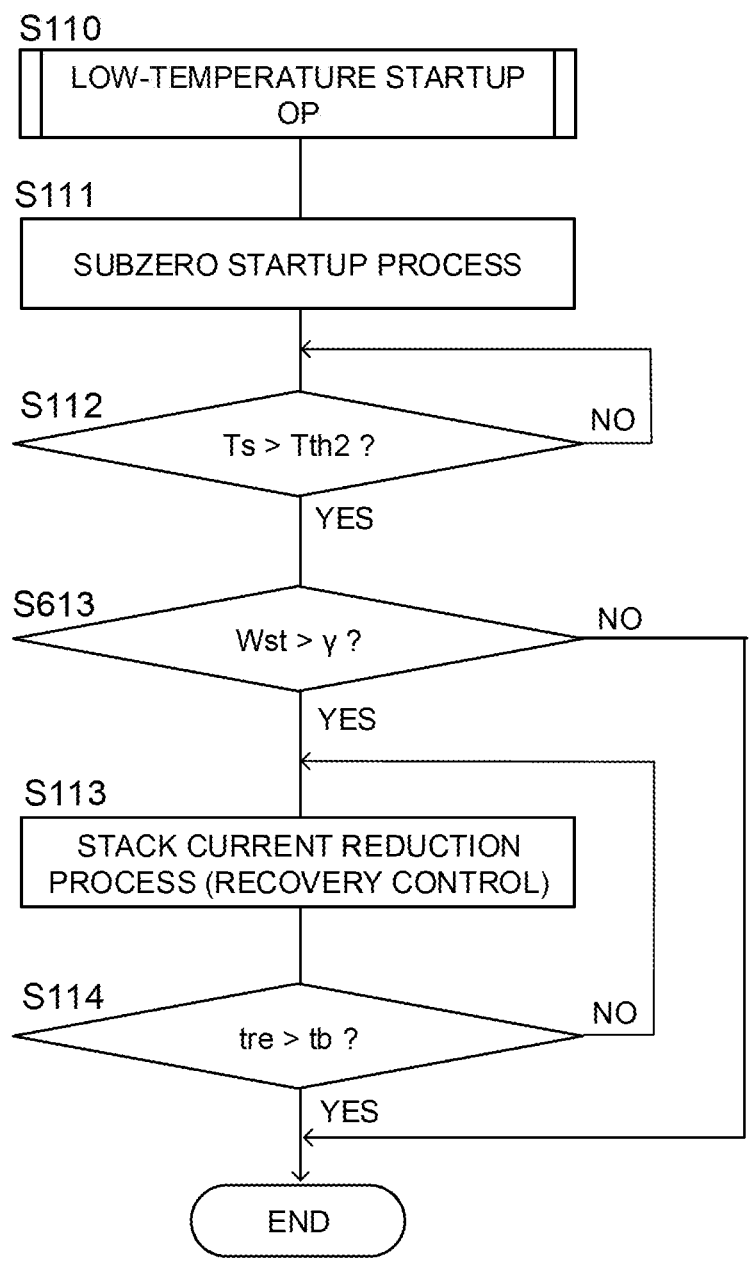
FIG. 19 is a flowchart explaining the flow of a low-temperature startup operation according to the sixth embodiment.

FIG. 19 is a flowchart explaining the flow of the low-temperature startup operation according to the present embodiment. As illustrated in the drawing, the control unit 200 executes the process of Steps S111 to S112 similarly to the first embodiment.

Then, in the present embodiment, when it is determined that the stack temperature Ts is larger than the recovery-control execution reference temperature Tth2 in Step S112, the control unit 200 performs the determination of whether the recovery control is executed in Step S613.

Specifically, in Step S613, the control unit 200 computes the stack water content Wst from the stack internal resistance Rst and compares the size between the stack water content Wst and the recovery control execution threshold α as described above.

In other words, when the computed stack water content Wst is larger than the recovery control execution threshold γ, the control unit 200 determines that the execution of the recovery control is necessary and executes the process after Step S113.

On the other hand, when the computed stack water content Wst is not more than the recovery control execution threshold γ, the control unit 200 determines that the execution of the recovery control is unnecessary and terminates the low-temperature startup operation. In other words, in this case, only the subzero startup process (unfreezing operation) is executed as the low-temperature startup operation.

The fuel cell system 100 according to the present embodiment described above has the following operational effect.

In the fuel cell system 100 according to the present embodiment, the control unit 200 as the recovery control unit functions as: an in-fuel-cell water content estimating unit that estimates the stack water content Wst that is the water content of the fuel cell stack 1 (Step S613 of FIG. 19); and a recovery-control execution determining unit that executes the recovery control when the estimated stack water content Wst is larger than the recovery control execution threshold α as the predetermined value (Yes of Step S613 of FIG. 19).

As a result, when it is considered that "the stack water content Wst is relatively high and much moisture remains inside the cathode catalyst layer 113A" and thus this possibly results in having an influence on the output performance of the fuel cell stack 1, the recovery control can be appropriately executed. On the other hand, when it is considered that the stack water content Wst is relatively low and thus this does not result in having an influence or results in having a small influence on the output performance of the fuel cell stack 1 even if the recovery control is not executed, the low-temperature startup operation can be terminated without executing the recovery control. Therefore, because the present embodiment can precisely determine a situation in which the recovery control is necessary to execute the recovery control when this is necessary but not to execute the recovery control when this is unnecessary, it is possible to contribute to the time shortening for the low-temperature startup operation.

Moreover, the fuel cell system 100 according to the present embodiment further includes the internal resistance measuring device 6 as an internal resistance detecting unit that detects the stack internal resistance Rst that is the internal resistance of the fuel cell stack 1. The control unit 200 as the in-fuel-cell water content estimating unit estimates the stack water content Wst based on the stack internal resistance Rst.

In other words, because the present embodiment estimates the stack water content Wst based on the stack internal resistance Rst that shows a strong correlation with the stack water content Wst and uses this to determine the execution of the recovery control, the determination of whether to execute the recovery control can be performed with higher precision by simple computation.

In addition, in the present embodiment, it has been explained that the stack water content Wst is estimated from the stack internal resistance Rst, but the present embodiment is not limited to this. For example, the stack water content Wst may be estimated based on other arbitrary parameters such as a cathode-gas supply pressure and a cathode-gas supply flow rate.

Moreover, as the measurement frequency of the internal impedance regarded as the stack internal resistance Rst in the present embodiment, it is preferable to select a frequency band in which this internal impedance preferably correlates with moisture contained in the anode 112, the cathode 113, and the electrolyte membrane 111 in the fuel cell stack 1. Particularly, it is the most preferable to select a measurement frequency from a frequency band such that the internal impedance strongly correlates with a water content in the cathode 113. As a result, the stack internal resistance Rst based on the internal impedance measured with the selected frequency correlates with an amount of moisture in the cathode catalyst layer 113A, which largely affects the output performance of the fuel cell stack 1, with higher accuracy.

Furthermore, the present embodiment may measure a high frequency resistance (HFR) that shows a strong correlation with the stack water content Wst (wettability of the electrolyte membrane 111) and regard this as the stack internal resistance Rst to estimate the stack water content Wst.

Seventh Embodiment

Hereinafter, the seventh embodiment of the present invention will be explained. It should be noted that the same components as those of the sixth embodiment have the same reference numbers and their descriptions are omitted. Particularly, according to the present embodiment, estimating the stack water content Wst in the sixth embodiment further considers the stack temperature Ts in addition to the stack internal resistance Rst.

Figure 20:
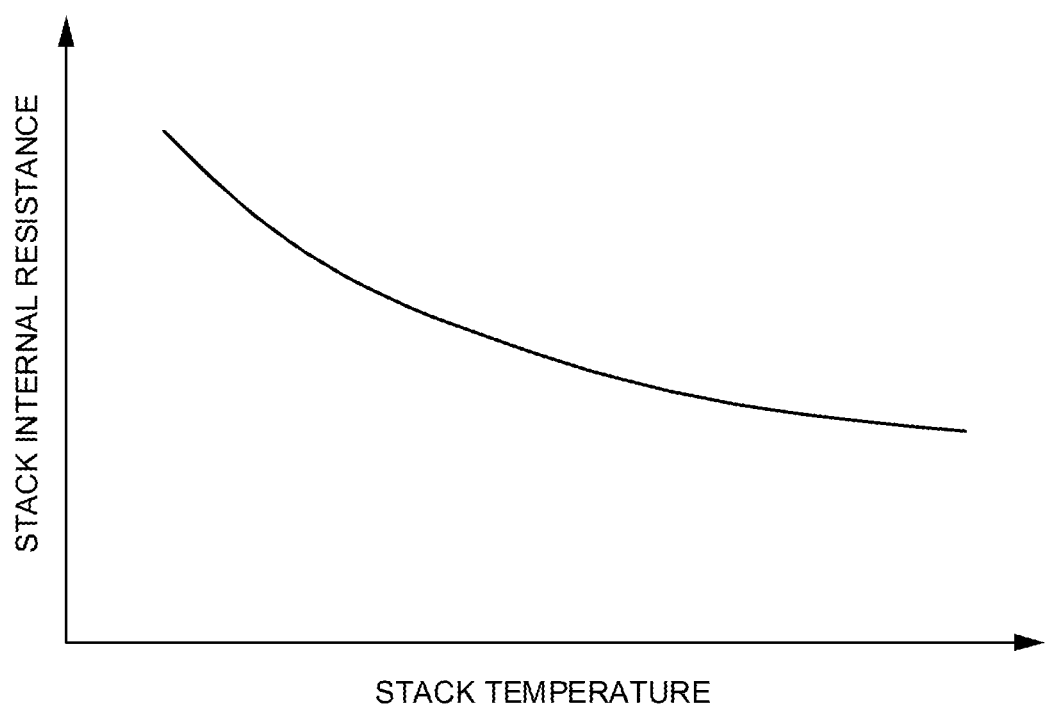
FIG. 20 is a graph illustrating a relationship between a stack temperature and a stack internal resistance according to a seventh embodiment.

FIG. 20 is a graph illustrating a relationship between the stack temperature Ts and the stack internal resistance Rst. As can be seen from the drawing, a relationship between the stack temperature Ts and the stack internal resistance Rst typically has the features that the stack internal resistance Rst is lower as the stack temperature Ts is higher.

As already explained above, the correlation represented by the graph of FIG. 18 is between the stack internal resistance Rst and the stack water content Wst. In other words, there is a relationship that the stack water content Wst is lower as the stack internal resistance Rst is higher.

Therefore, it is possible to define a stack-water-content estimation map that indicates the relationship between the stack internal resistance Rst, the stack temperature Ts, and the stack water content Wst.

Figure 21:
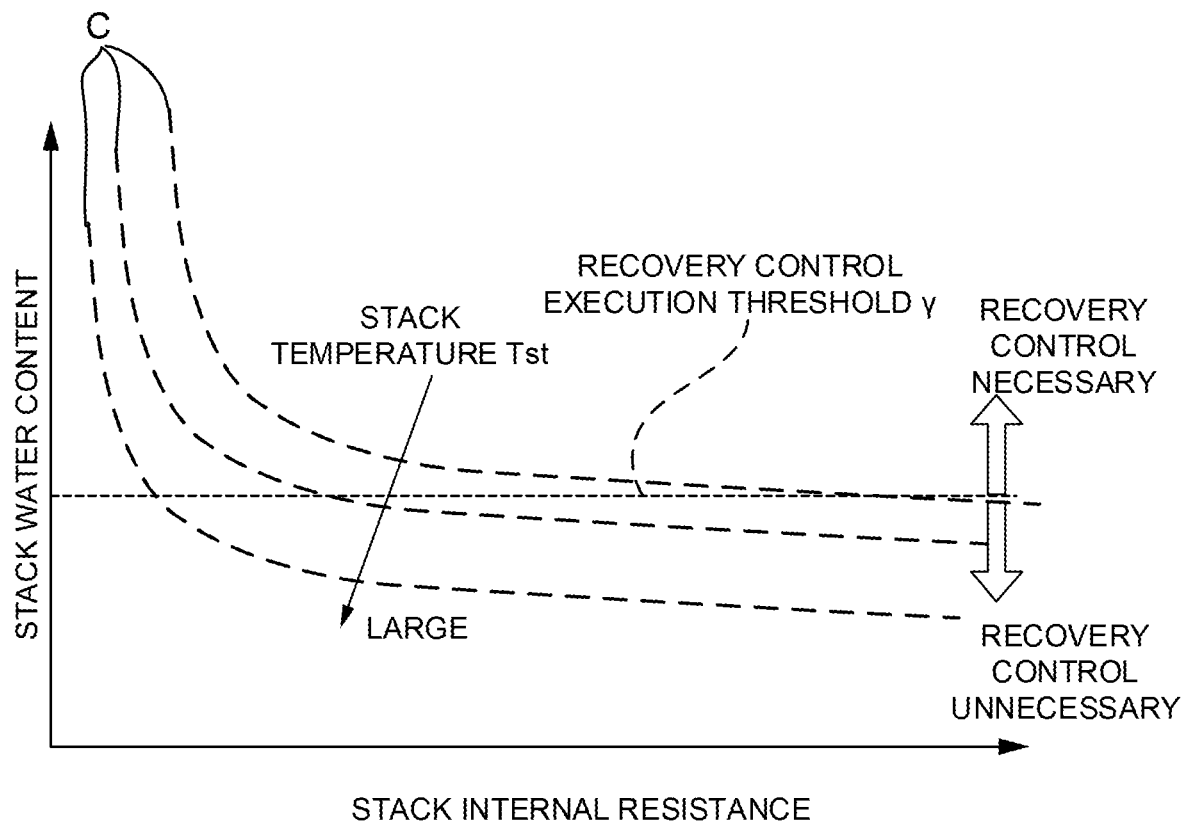
FIG. 21 is a map illustrating a relationship between a stack internal resistance, a stack temperature, and a stack water content.

FIG. 21 illustrates the stack-water-content estimation map defined in the present embodiment. In this stack-water-content estimation map, the stack water content Wst becomes lower as the stack internal resistance Rst is higher, similarly to the sixth embodiment. Moreover, a curved-line group C of a plurality of curved lines according to the stack temperature Ts is set to perform a correction such that the stack water content Wst becomes lower as the stack temperature Ts becomes higher.

In the present embodiment, the stack-water-content estimation map is stored in a memory etc. of the control unit 200.

Hereinafter, there will be explained the flow of the estimation of the stack water content Wst using the stack-water-content estimation map according to the present embodiment.

First, the control unit 200 acquires the stack temperature Ts detected by the water temperature sensor 47 and selects a curved line corresponding to the detected value of the stack temperature Ts from among the curved-line group C of the stack-water-content estimation map. Then, the control unit 200 estimates the stack water content Wst, based on the selected curved line, from the measured value of the stack internal resistance Rst measured by the internal resistance measuring device 6.

The fuel cell system 100 according to the present embodiment described above has the following operational effect.

The fuel cell system 100 according to the present embodiment includes the water temperature sensor 47 acting as a fuel-cell temperature detecting unit that detects the stack temperature Ts that is the temperature of the fuel cell stack 1. Then, the control unit 200 acting as the in-fuel-cell water content estimating unit estimates the stack water content Wst based on the stack internal resistance Rst and the stack temperature Ts.

In other words, in addition to the stack internal resistance Rst, further by using the stack temperature Ts that has an influence on the stack internal resistance Rst, the stack water content Wst is estimated. Therefore, because the stack water content Wst can be estimated with higher accuracy, it is possible to more appropriately determine whether to execute the recovery control based on the estimated stack water content Wst.

Eighth Embodiment

Hereinafter, the eighth embodiment of the present invention will be explained. It should be noted that the same components as those of the first embodiment have the same reference numbers and their descriptions are omitted. Particularly, according to the present embodiment, as the recovery control explained in the first embodiment, a purging process for discharging impurities (nitrogen, water, etc.) within gas inside the anode gas circulation passage 35 to the outside is executed in addition to the stack current reduction process.

Figure 22:
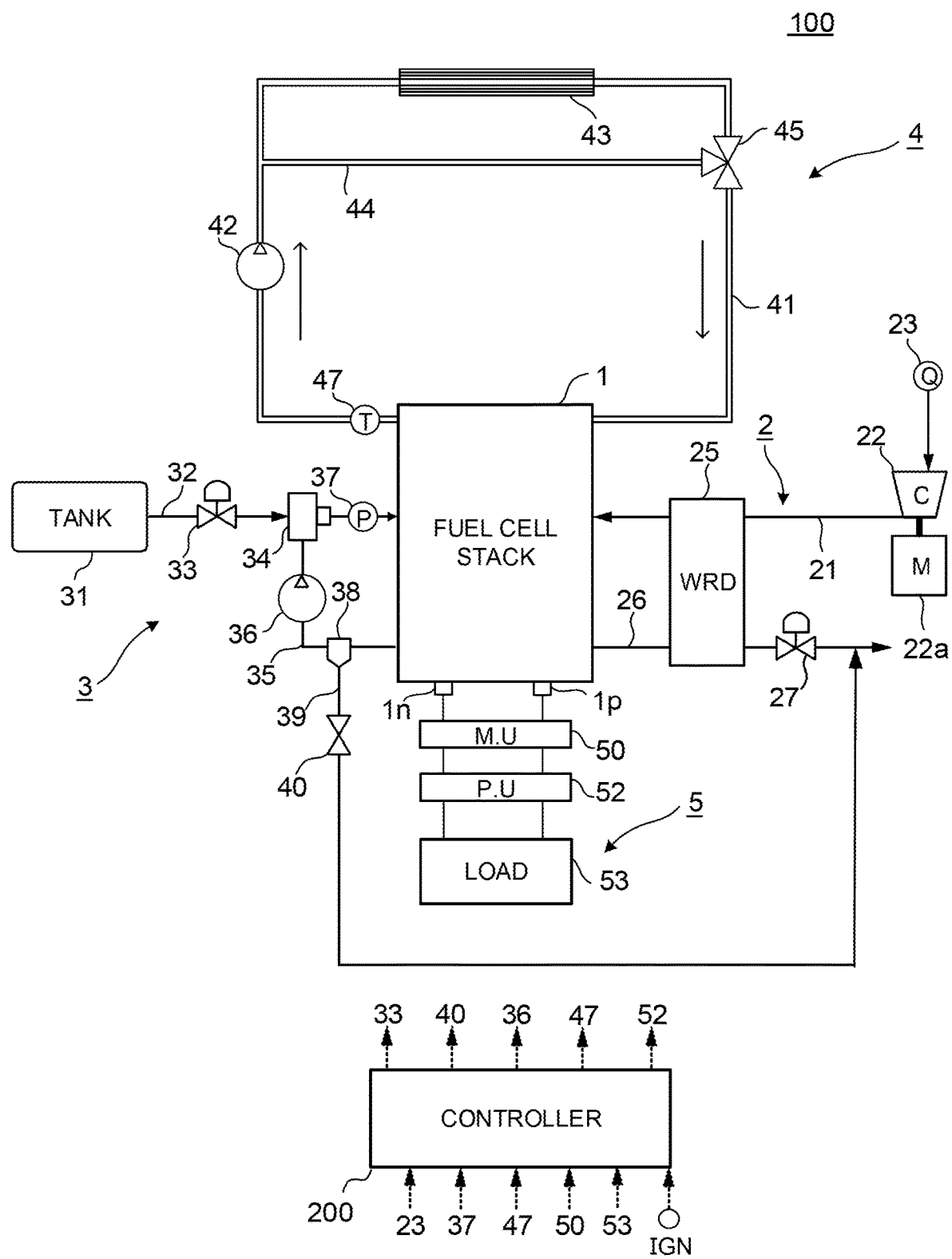
FIG. 22 is a diagram illustrating the configuration of a fuel cell system according to an eighth embodiment.

FIG. 22 is a drawing illustrating the configuration of the fuel cell system 100 according to the eighth embodiment.

As illustrated in the drawing, in the present embodiment, the anode gas supply/discharge apparatus 3 includes a purge passage 39 that is provided via a gas-liquid separation device 38 near an anode outlet of the fuel cell stack 1.

The gas-liquid separation device 38 is a centrifugal device, for example. The gas-liquid separation device 38 separates the impurities into a liquid component and a gas component. Herein, the separated liquid component is discharged from a discharge system (not illustrated) to the outside of the fuel cell system 100 and the gas component is discharged to the purge passage 39.

The purge passage 39 is provided to communicate with the anode gas circulation passage 35 via the gas-liquid separation device 38 and joins the cathode offgas discharge passage 26 on the downstream side of the cathode gas pressure adjusting valve 27. The purge passage 39 is a passage for discharging to the outside impurities such as nitrogen gas contained in gas within the anode gas circulation passage 35 and moisture coming from the produced water etc. of power generation.

In addition, the impurities discharged via the purge passage 39 contain hydrogen having slight concentration. However, the impurities are mixed with the cathode offgas in the cathode offgas discharge passage 26 and are discharged to the outside of the fuel cell system 100 in the state where hydrogen concentration is not more than a prescribed value.

Moreover, a purge valve 40 is provided in the purge passage 39. In the open state of the valve, the purge valve 40 discharges the impurities to the cathode offgas discharge passage 26 via the purge passage 39. In addition, the opening and closing of the purge valve 40 is controlled by the control unit 200.

In the fuel cell system 100 having the configuration, the recovery control in the present embodiment is to execute a purge valve opening process for opening the purge valve 40. As a result, because moisture is discharged via the purge passage 39 from inside the anode gas circulation passage 35, it is possible to decrease the moisture content of anode gas to be supplied to the fuel cell stack 1.

The fuel cell system 100 according to the present embodiment described above has the following operational effect.

In the fuel cell system 100 according to the present embodiment, the anode gas supply/discharge apparatus 3 includes: the anode gas circulation passage 35 acting as a circulation path that communicates with the anode flow channels 121 to circulate anode gas to be supplied to the fuel cell stack 1; the purge passage 39 that communicates with the anode gas circulation passage 35; and the purge valve 40 that is provided in the purge passage 39.

The control unit 200 acting as the recovery control unit performs the open and close control of the purge valve 40 to discharge moisture from the anode gas circulation passage 35, as the recovery control.

As a result, because moisture is discharged via the purge passage 39 from inside the anode gas circulation passage 35 during the recovery control, it is possible to decrease a moisture content within anode gas to be supplied to the fuel cell stack 1. Therefore, the degradation of a moisture content in the anode catalyst layer 112A is promoted, and thus the concentration gradient of water between the anode catalyst layer 112A and the cathode catalyst layer 113A is promoted to become larger. As a result, because moisture movement from the cathode catalyst layer 113A to the electrolyte membrane 111 is further promoted, the output performance of the fuel cell stack 1 in the low-temperature startup operation can be more promptly recovered. Consequently, this contributes to the further shortening of the low-temperature startup operation.

In addition, the purge valve opening process as the recovery control according to the present embodiment may be executed along with at least one of the stack current reduction process of the first and second embodiments and the anode-gas supply flow-rate increase process of the third embodiment.

As described above, the embodiments of the present invention have been explained, but the above embodiments are only a part of the application example of the present invention and the technical scope of the present invention is not intended to be limited to the specific configurations of the above embodiments.

For example, the recovery control is not limited to the aspects explained in the embodiments. Another example of the recovery control may supply arbitrary inert gas having comparatively high diffusion effect except anode gas to the anode 112, for example, and execute a process for removing moisture in the anode catalyst layer 112A to heighten the concentration gradient of water in the electrolyte membrane 111.

Moreover, it has been explained that the above embodiments execute the subzero startup process and then perform the recovery control. However, when unfreezing moisture in the fuel cell stack 1 is not necessarily required even if the stack temperature Ts is less than 0° C., only the recovery control may be executed without executing the subzero startup process as the low-temperature startup operation.

Furthermore, when executing the subzero startup process, if the stack temperature Ts arrives at a temperature (temperature at which a back-diffusion phenomenon can occur) at which the recovery control can be performed even though the stack temperature Ts is less than 0° C., the recovery control may be executed after terminating the subzero startup process or along with the subzero startup process. As a result, a timing at which the recovery control is started can be advanced as much as possible and thus a time for the low-temperature startup operation can be further shortened.

Moreover, the above embodiments can take an optional combination. For example, the first to third and eighth embodiments respectively indicate concrete execution aspects of the recovery control during the low-temperature startup operation. Furthermore, the fourth and fifth embodiments indicate concrete execution aspects of the termination determination of the recovery control. Moreover, the sixth and seventh embodiments indicate concrete aspects for the determination of whether to execute the recovery control.

Therefore, at least, execution aspects of the recovery control illustrated in the first to third and eighth embodiments, execution aspects of the termination determination of the recovery control illustrated in the fourth and fifth embodiments, and aspects to execute the determination of whether to execute the recovery control illustrated in the sixth and seventh embodiments can be combined by using all combinations considered based on the scope of disclosure of the embodiments.

The invention claimed is:

1. A fuel cell system comprising:
a fuel cell stack in which a plurality of cells is stacked, each of the cells including:
an electrolyte membrane that includes catalyst layers on both sides of an anode and a cathode; an anode flow channel that supplies fuel gas to the anode; and a cathode flow channel that supplies oxidation gas to the cathode;
a fuel gas adjusting apparatus that adjusts a flow rate of the fuel gas in the anode flow channel;
an oxidation gas adjusting apparatus that adjusts a flow rate of the oxidation gas in the cathode flow channel;
a concentration gradient adjusting apparatus; and
a control unit programmed to:
control the fuel gas adjusting apparatus and the oxidation gas adjusting apparatus in accordance with a state of the fuel cell stack,
adjust a concentration gradient of water in the electrolyte membrane between the anode and the cathode, wherein the concentration gradient of water is given as a ratio of a moisture content contained in a cathode catalyst layer to a moisture content contained in an anode catalyst layer,
determine whether an operating state of the fuel cell system is a low-temperature startup operation or a normal-running operation, the low-temperature startup operation being an operation for raising a temperature of the fuel cell stack, the normal-running operation being an operation for allowing power generation of the fuel cell stack, and
execute recovery control for causing the concentration gradient adjusting apparatus to increase the concentration gradient of water in the electrolyte membrane to be larger than that in the normal-running operation when the control unit determines that the operation state is the low-temperature startup operation, the recovery control causing moisture in the cathode catalyst to move to the electrolyte membrane during the low-temperature startup operation.

2. The fuel cell system according to claim 1, wherein
the concentration gradient adjusting apparatus includes an output current adjusting device, and
the control unit is further programmed to execute the recovery control by causing the output current adjusting device to decrease an output current to be lower than a required output current based on a requested load so as to increase the concentration gradient of water in the electrolyte membrane.

3. The fuel cell system according to claim 2, wherein the control unit is further programmed to cause the output current adjusting device to adjust the output current to substantially zero.

4. The fuel cell system according to claim 1, wherein
the concentration gradient adjusting apparatus includes the fuel gas adjusting apparatus, and
the control unit is further programmed to cause the fuel gas adjusting apparatus to increase a fuel-gas supply flow rate to be larger than a requested fuel-gas supply flow rate based on a requested load so as to increase the concentration gradient of water in the electrolyte membrane.

5. The fuel cell system according to claim 1, wherein the control unit is further programmed to determine a termination time of the recovery control and terminates the recovery control when the termination time of the recovery control is determined.

6. The fuel cell system according to claim 5, further comprising:
an output voltage detecting sensor that detects an output voltage of at least one of the fuel cell stack and a single cell of the cells, wherein
the control unit is further programmed to:
control the oxidation gas adjusting apparatus during the recovery control to execute at least once an oxidation gas increase-decrease process for decreasing and then increasing an oxidation-gas supply flow rate to the cathode flow channel; and
determine the termination time of the recovery control based on a behavior of the output voltage during the oxidation gas increase-decrease process.

7. The fuel cell system according to claim 6, wherein the control unit is further programmed to control the oxidation gas adjusting apparatus so that a ratio of the oxidation-gas supply flow rate to a requested oxidation-gas supply flow rate based on the requested load becomes not more than one at a time of a decrease operation of the oxidation-gas supply flow rate during the oxidation gas increase-decrease process.

8. The fuel cell system according to claim 6, wherein the control unit is further programmed to determine the termination time of the recovery control when the output voltage arrives at a predetermined threshold within a predetermined time at a time of an increase operation of the oxidation-gas supply flow rate during the oxidation gas increase-decrease process.

9. The fuel cell system according to claim 6, wherein
the control unit is further programmed to:
compute a time differential value of the output voltage at the time of the increase operation of the oxidation-gas supply flow rate as the behavior of the output voltage during the oxidation gas increase-decrease process; and determine the termination time of the recovery control when the time differential value is larger than a predetermined value.

10. The fuel cell system according to claim 1, wherein the control unit is further programmed to:
estimate a water content in the fuel cell stack; and
execute the recovery control when the estimated water content is larger than a predetermined value.

11. The fuel cell system according to claim 10, further comprising:
an internal resistance detecting device that detects an internal resistance of the fuel cell stack, wherein
the control unit is further programmed to estimate the water content based on the internal resistance of the fuel cell stack.

12. The fuel cell system according to claim 11, further comprising:
a fuel-cell temperature detecting sensor that detects a temperature of the fuel cell stack, wherein
the control unit is further programmed to estimate the water content based on the internal resistance of the fuel cell stack and the temperature of the fuel cell stack.

13. The fuel cell system according to claim 1, wherein the fuel gas adjusting apparatus includes: a circulation path that communicates with the anode flow channel to circulate fuel gas to be supplied to the fuel cell stack; a purge passage that communicates with the circulation path; and a purge valve that is provided in the purge passage, and the control unit is further programmed to perform open/close control of the purge valve to discharge moisture from the circulation path as the recovery control.

14. A control method for a fuel cell system including a fuel battery, the method comprising:
determining whether an operating state is a low-temperature startup operation or a normal-running operation, the low-temperature startup operation being an operation for raising a temperature of a fuel cell stack, the normal-running operation being an operation for allowing power generation of the fuel cell stack; and
executing recovery control for increasing a concentration gradient of water in an electrolyte membrane of the fuel battery to be larger than that in the normal-running operation when it is determined that the operating state is the low-temperature startup operation, wherein the concentration gradient of water is given as a ratio of a moisture content contained in a cathode catalyst layer to a moisture content contained in an anode catalyst layer.

15. The control method for the fuel cell system according to claim 14, wherein
the executing includes, as the recovery control, decreasing an output current of the fuel battery to be lower than a required output current based on a requested load so as to increase the concentration gradient of water in the electrolyte membrane.

* * * * *